Nov. 19, 1968    J. L. AKER    3,412,400
METHOD AND APPARATUS FOR DIGITALLY MEASURING DISTANCE
Filed Aug. 24, 1966    16 Sheets-Sheet 16
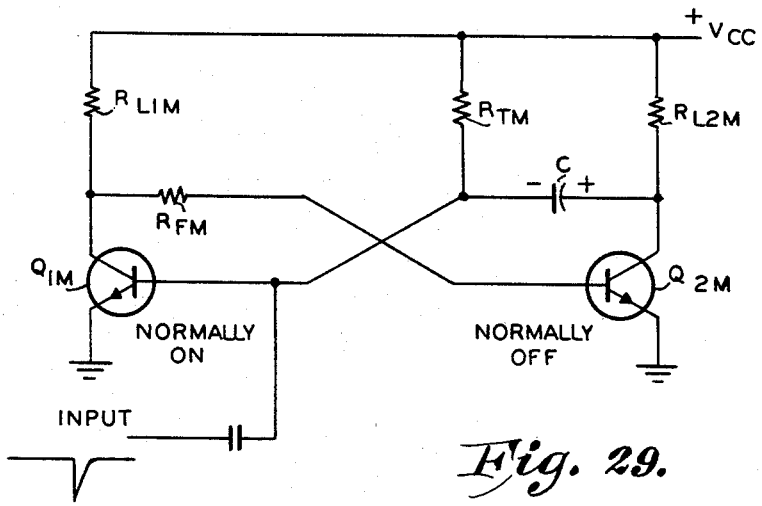
Fig. 29.
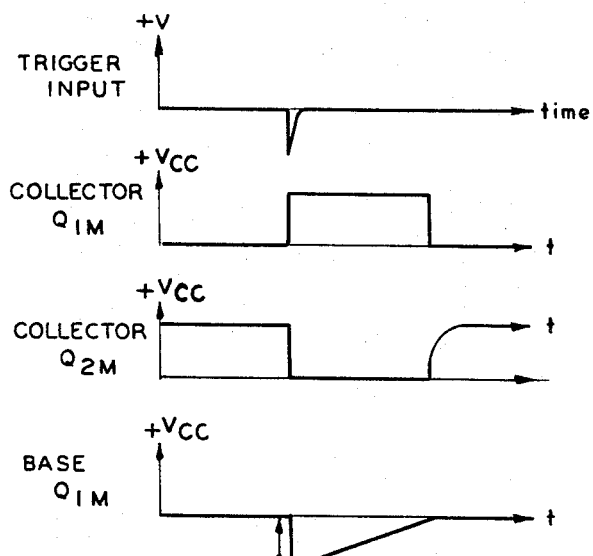
Fig. 30.
| FIG. 2 | FIG. 5 | |
|--------|--------|--------|
| FIG. 3 | | |
| FIG. 4 | FIG. 6 | FIG. 7 |
Fig. 28.
INVENTOR
John L. Aker
BY Scofield, Kokjer, Scofield & Lowe
ATTORNEYS

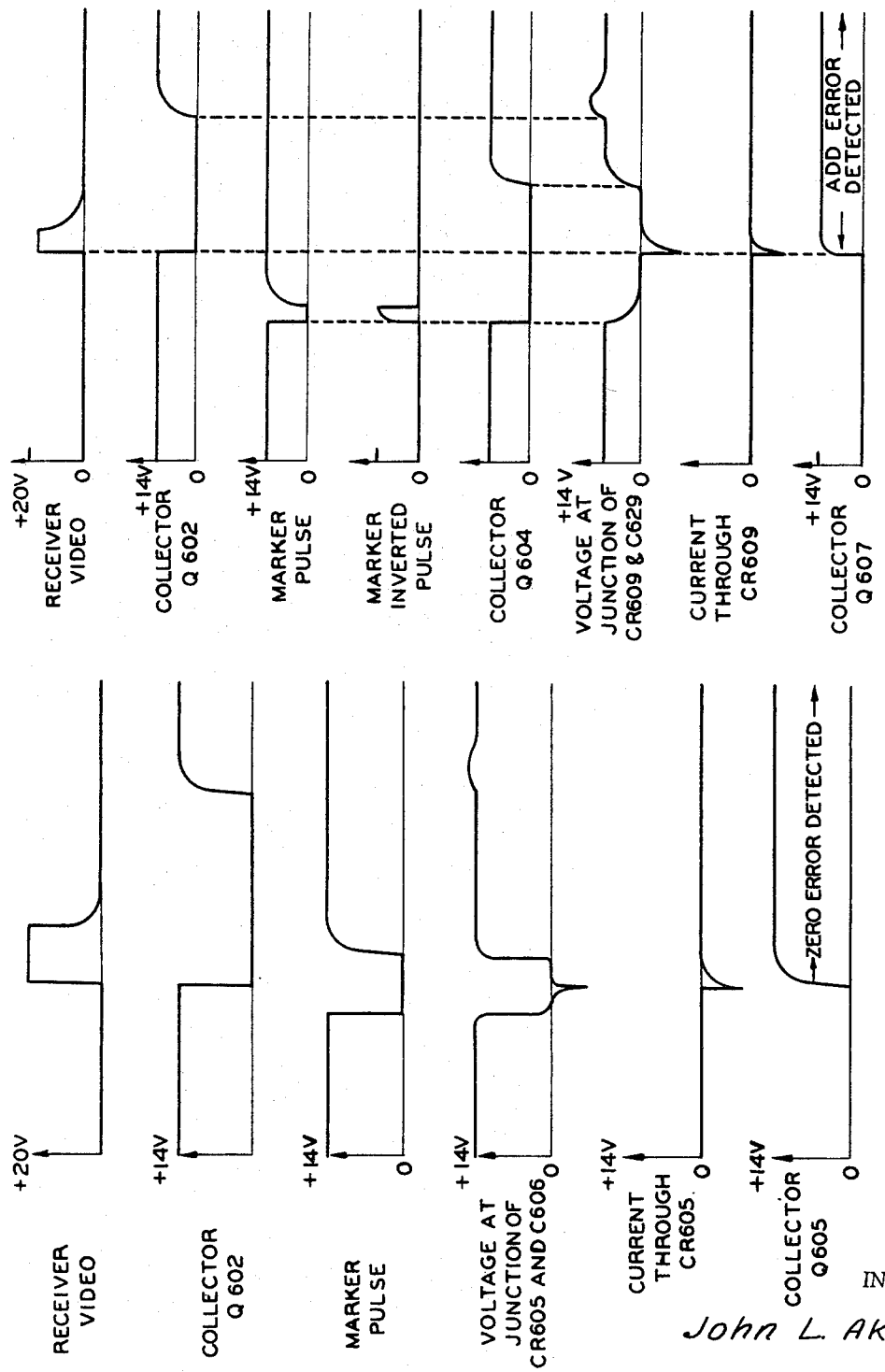

INVENTOR
John L. Aker

Nov. 19, 1968  J. L. AKER  3,412,400
METHOD AND APPARATUS FOR DIGITALLY MEASURING DISTANCE
Filed Aug. 24, 1966  16 Sheets-Sheet 11
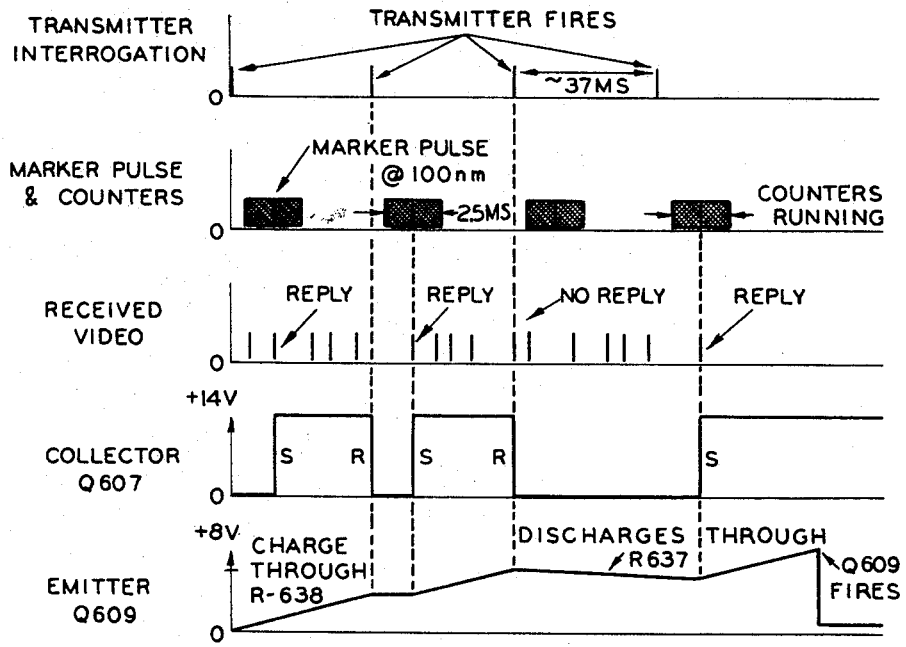
Fig. 27.
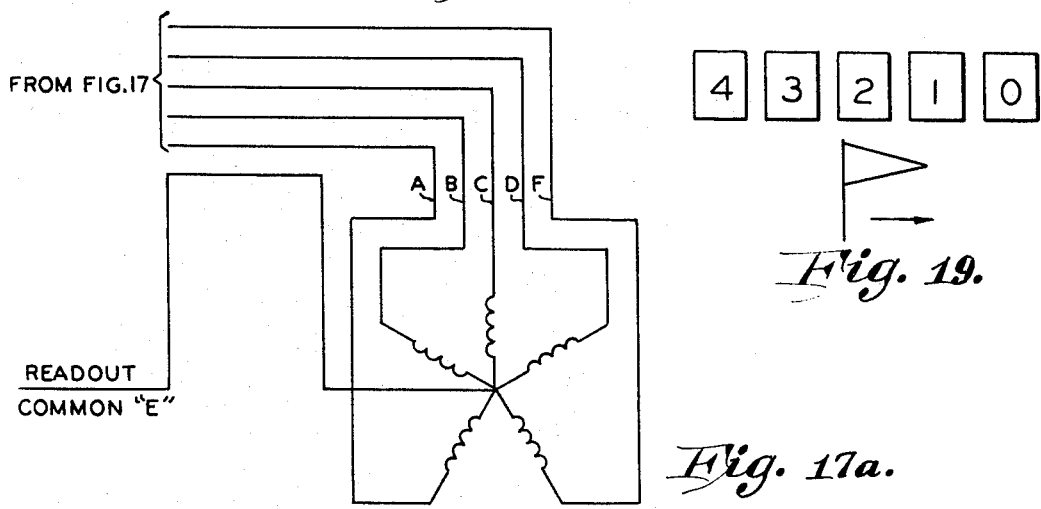
Fig. 19.
Fig. 17a.
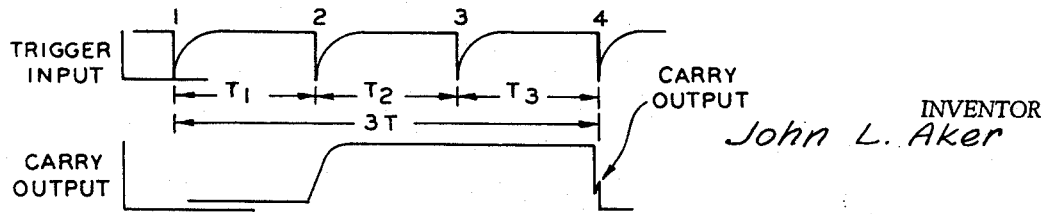
Fig. 20.
INVENTOR
John L. Aker
BY
ATTORNEYS

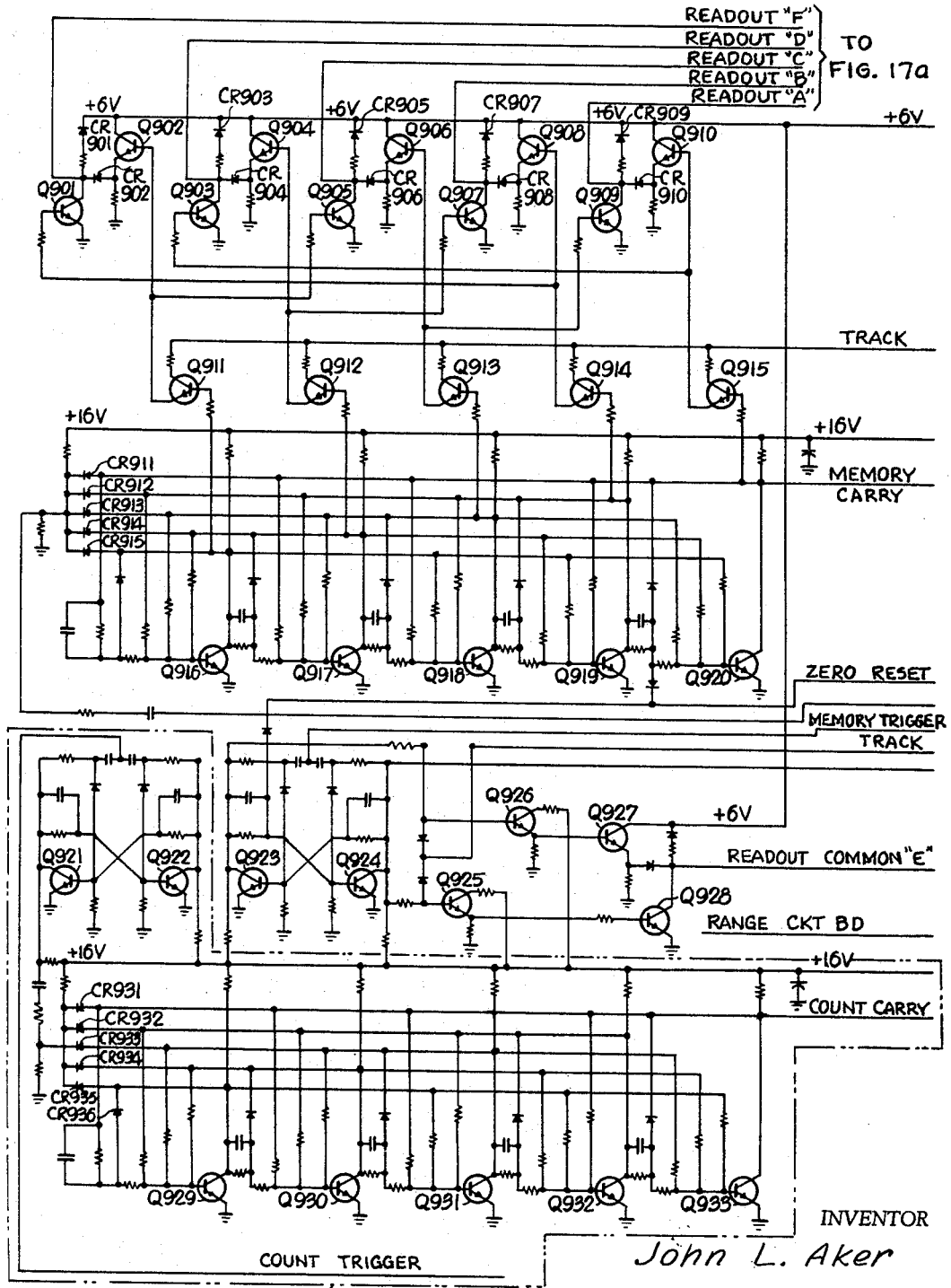

Nov. 19, 1968

J. L. AKER 3,412,400

METHOD AND APPARATUS FOR DIGITALLY MEASURING DISTANCE

Filed Aug. 24, 1966

INVENTOR
John L. Aker

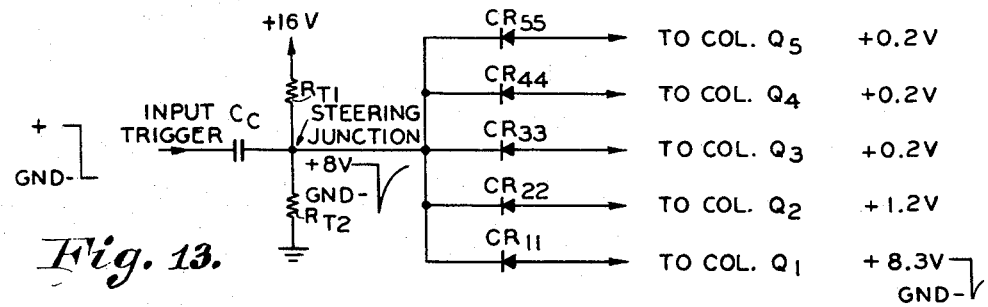
*Fig. 13.*
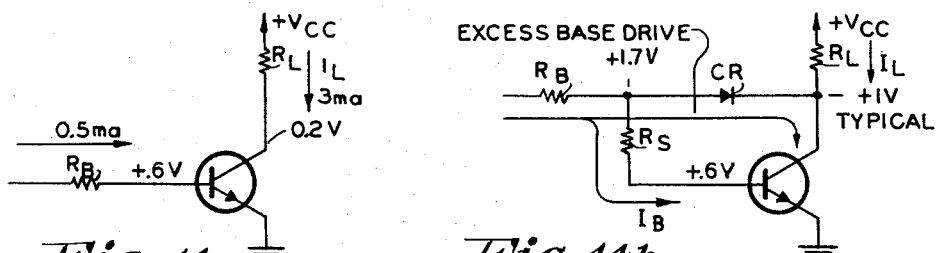
*Fig. 14a.*   *Fig. 14b.*
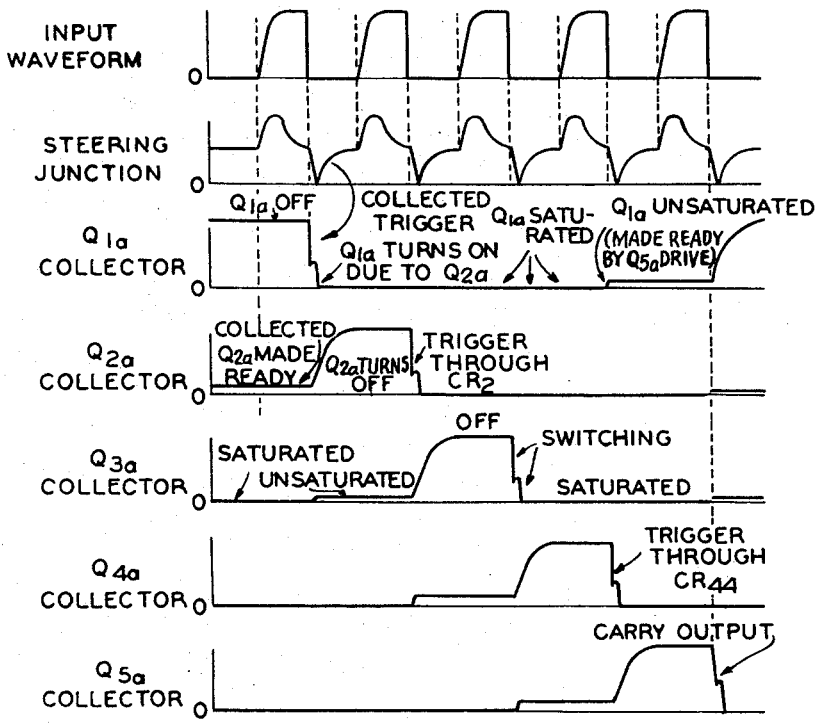
*Fig. 15.*
INVENTOR
John L. Aker INVENTOR.
John L. Aker

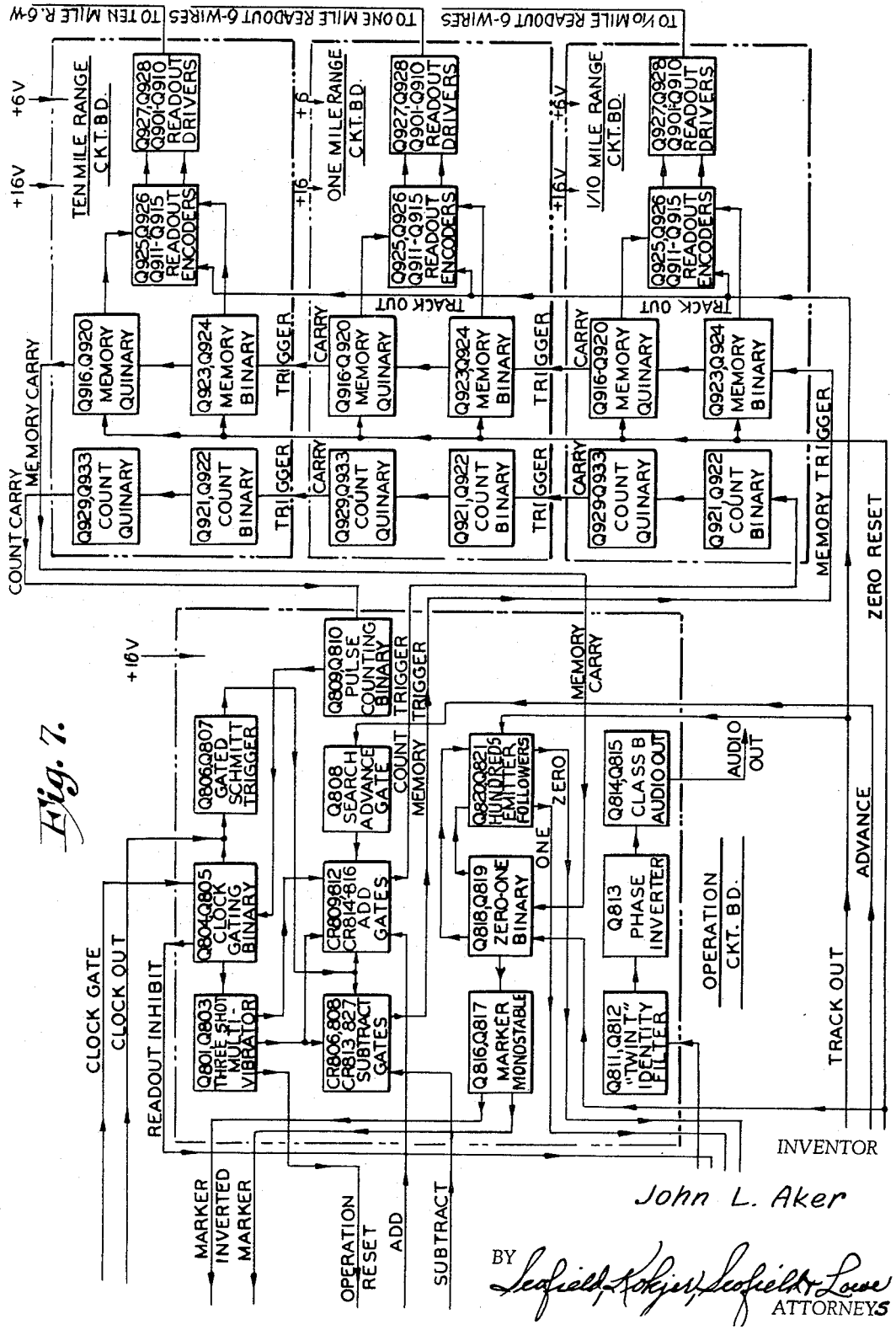

Nov. 19, 1968  J. L. AKER  3,412,400
METHOD AND APPARATUS FOR DIGITALLY MEASURING DISTANCE
Filed Aug. 24, 1966  16 Sheets-Sheet 7

INVENTOR
John L. Aker
BY
Scofield, Kokjer, Scofield & Lowe
ATTORNEYS

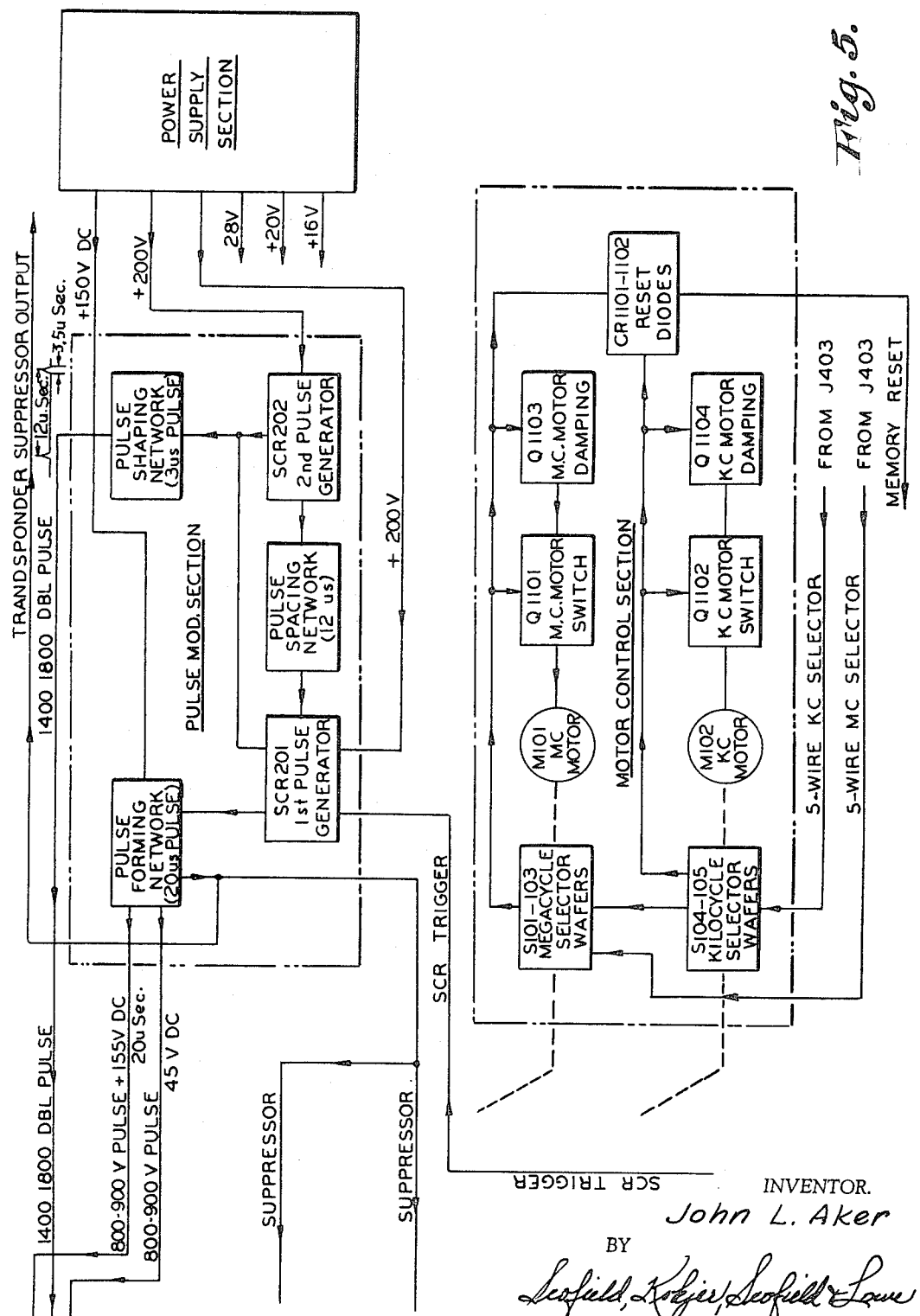

INVENTOR.
John L. Aker

Nov. 19, 1968   J. L. AKER   3,412,400
METHOD AND APPARATUS FOR DIGITALLY MEASURING DISTANCE
Filed Aug. 24, 1966   16 Sheets-Sheet 2

INVENTOR
John L. Aker

BY
ATTORNEYS

Nov. 19, 1968  J. L. AKER  3,412,400
METHOD AND APPARATUS FOR DIGITALLY MEASURING DISTANCE
Filed Aug. 24, 1966  16 Sheets-Sheet 1

INVENTOR
John L. Aker
BY
ATTORNEYS

United States Patent Office 3,412,400
Patented Nov. 19, 1968

3,412,400
METHOD AND APPARATUS FOR DIGITALLY
MEASURING DISTANCE
John L. Aker, Olathe, Kans., assignor to King Radio
Corporation, a corporation of Kansas
Filed Aug. 24, 1966, Ser. No. 574,701
31 Claims. (Cl. 343—7.3)

ABSTRACT OF THE DISCLOSURE

A digitally operated DME is adapted to transmit interrogation pulses and to receive replies from a ground station transponder. The DME operates in either a search or a track mode by producing a Marker pulse representing an assumed time duration wherein a Return pulse would frequently occur for every interrogation pulse if the DME were at a distance that correlated to the respective pulse travel time duration. The time for production of the Marker pulse is digitally changeable by the use of two unidirectional counting registers until the ratio of reply pulses to interrogation pulses over a plurality of interrogations is at least a predetermined minimum.

---

This invention relates to distance-ground speed measuring equipment and more particularly to digitally operated equipment designed for use in medium aircraft. This equipment is commonly referred to as a DME, functions by measuring the length of time between transmissions of a radio signal to a preselected VOR/DME station and reception of a reply signal. The distance may then be indicated in nautical miles on a range/speed/time to station indicator.

Distance, measured on a slant, from air to ground, is commonly referred to as slant-range distance and should not be confused with the actual ground distance. The difference between ground distances is smallest at low altitude and long range. These differences may vary considerably when in close proximity to a VOR/DME facility, however if the range is three times the altitude or greater, this error is generally negligible from the pilot's point of view.

For background information, distance measuring equipment is an outgrowth of radar ranging techniques, whereby a distance is determined by measuring the round-trip time of travel of radio pulse signals between the two points in question. In DME (distance measuring equipment) systems, a direct reading indicator is used to display distance rather than the visual use of a cathode ray tube, as is peculiar to radar systems. Also, instead of depending on fragile reflections or echoes for the return trip of the pulses, a "transponder" or "beacon" is used to produce artificial echoes. These artificial responses are stronger and their radio channels positively identify the source of the "echo" and hence the geographic location of the echoing point.

The airborne transmitter repeatedly sends out very short, widely spaced "interrogation" pulses. These are picked up by the ground beacon receiver, whose output triggers the associated transmitter into sending out "reply" pulse on a *different channel*. These replies are finally picked up by the airborne receiver. Timing circuits automatically measure the round trip travel time, or interval between interrogation and reply pulse, and convert this time into electrical signals which operate the distance indicator.

In system operation, a given ground beacon (transponder) will be interrogated by a number of aircraft which are within range and which have tuned to its channel. The ground beacon will then reply to all interrogations, and each airplane will receive the sum total of replies to all airplanes. To permit interference-free operation under such normal conditions, it is arranged that each aircraft's interrogation pulse occur at a rate that is intentionally permitted to "jitter" or vary (within certain limits) in an irregular or random manner. The "jitter" effect is obtained essentially by permitting a randomly modulated timing circuit to exercise gross control over the interrogation rate. In order to determine which ones among the reply pulses received on a given aircraft, are replies to that aircraft's own interrogation pulse, a unique "search process" entirely automatic in its operation, is employed by the present invention.

The search operating principle is to locate the proper reply pulse by finding that one fixed time delay, measured always from the DME's own previous interrogation pulse, at which a reply pulse is repeatedly received. Because interrogation pulses from other aircraft are nonsynchronous or random with respect to hte given aircraft's interrogation pulse, reply pulses corresponding to such "foreign" interrogations wi!l not be received regularly at one fixed (or slowly changing) time delay, on the given aircraft.

The DME, in the "search" mode of operation, searches automatically each time the airborne set is initially tuned to a new ground-beacon channel or if there is some major interruption in the radio signals. The system scans, progressively, various time delay intervals by means of a sliding "range gate" or "time slot" which quickly tests each time slot position for the number of successive reply pulses received within a certain uniform checking period. If no replies or only sporadic replies are receiver, the time slot is advanced to test a slightly longer time delay interval, and so on. When, at some particular time interval, safe evidence of recurrent replies is detected (by a unique counting process) the search is completed and stopped, since this condition is fulfilled only by reception of a desired number of reply pulses. Those pulses are the only ones which are always received with the same time relationship to the given airplane's own randomly jittered interrogation pulses.

Thereafter, the unit "locks" onto the proper pulses and transfers over to "track" operation. The term "track" is used to indicate that the delay setting of the timing circuits automaticaly and continuously follows any normal variation in the time delay of the proper reply pulses. Such variations wi!l occur if the airplane's distance is actually changing as a result of its flight path, but are necessarily very small because of the relationship between interrogation rates and actual airplane speeds. This relationship will be discussed in greater detail infra.

All the time that the DME is locked onto the proper reply pulses during the tracking process, the time delay setting on the range-gate or time aperture is a proportionate measure of the airplane's distance from the ground beacon (approximately 12 microseconds round-trip travel time per nautical mile). The circuitry that varies the time delay of the time slot is used to position corresponding indicating wheels or an indicating meter of a suitable design on a distance readout, by means of electrical control signals.

An object of the invention is to provide an improved DME which is extremely accurate, relatively light weight and inexpensive.

Another object of the invention is to provide an unique method and apparatus for Distance Measuring Equipment that digitally makes al decisions involving searching or tracking.

Another object of the invention is to provide a DME having unique counting circuitry therein, a portion of said circuitry being a new and improved biquinary or scale of ten counter.

A further object of the invention is to provide in a DME, an unique Count Loop that will count and gate a preselected number of precision clock pulses each time that the DME interrogates the ground station.

A still further object of the invention is to provide, in a DME, a Memory Chain that wil convert a stored number into a time delay by counting that number (the stored number) of clock pulses. It is an important feature of the invention that the accuracy of the time delay is essentially that of the source of clock pulses which in the case of the instant invention originates from a highly stable crystal oscillator.

Another object of the invention is to provide, in a DME of the character described, an active Memory Chain that destroys the stored number by the conversion process and recreates said number before a further interrogation is made.

A further object of the invention is to provide an unique counting system wherein an unidirectional counter is effectively made bidirectional for shifting purposes by use of a Count Loop.

Another object of the invention is to provide an unique counting system utilizing first and second counters having the same capacity, said first counter being a part of a Count Loop that is so arranged and controlled that if both counters are simultaneously fed a number of pulses equal to their capacity the second counter will count through a complete cycle and return to its original state.

Another object of the invention is to provide, in a counting system of the character described, a system wherein the state of the second counter may be shifted by an amount equal to the number of "additional pulses" added to the first counter, said "additional pulses" being separately derived and applied only to the first counter.

Another object of the invention is to provide a pulse rate for velocity measurement circuitry that will indicate the relative velocity of the aircraft with respect to the ground station, said velocity being proportional to the rate of change of the least significant distance number or least significant digital distance increment. In this manner an accurate measurement and display of ground speed is obtainable.

Another object of the invention is to provide counter-readout encoding circuitry that is arranged so that the number assigned to each counter state is a function of the number of aditional pulses that must be fed to each counter before said counter clears. This circuit arrangement provides for economical information retrieval in that the circuit need only to to count the number of pulses required to clear said counter to determine the previous state of the counter.

Another object of the invention is to provide, in a DME, including counter-readout encoding circuitry, of the character described, a Memory Chain which will produce a Marker pulse for any number stored therein, there being a direct relationship between any number and the time necessary to convert the number into said Marker pulse. This arrangement helps enable the DME to determine whether that number (stored number) represented by the Marker pulse, corresponds to a time delay that matches the time delay of the radio wave from the aircraft to the ground station and back.

Another object of the invention is to provide Search Track Decision Circuitry which will periodically test a time aperture around the Marker pulse to either continuously track Returns within said time aperture or to search for a Marker pulse which will correlate in time relationship with said Returns.

A further object of the invention is to provide Search Track Decision Circuitry of the character described which searches and/or tracks Marker-Return correlations on a ratio basis.

A still further object of this invention is to provide, in a DME, Marker-Return sequence determining circuitry which determines whether: (1) the Marker pulse follows a Return; (2) the Marker pulse is in time coincidence with the Return; or (3) the Marker pulse precedes a Return within the allotted time aperture.

Another object of the invention is to provide, in sequence determining circuitry of the character described, circuitry means for determining if a *valid* time differential occurs between the Marker pulse and Returns within the allotted time aperture. This circuitry means functions to cause the DME to ignore any replies within said time aperture that are not valid Returns.

Another object of the invention is to provide, in sequence determining circuitry of the character described, a circuit means for commanding the Marker pulse to be developed in time coincidence with the Return when a valid time differential between Marker and Return is detected.

A still further object of the invention is to provide, in sequence determining circuitry of the character described, a circuit means which "remembers" the direction of the last change in distance, e.g., command for developing the Marker at a new time to be in time coincidence with the Return.

Another object of the invention is to provide in a DME, a circuit means for interpolation of the indicated distance in the direction of the last known distance change. This interpolation circuit means will provide a continuous display of distance, and indicated distance change, either to or from the ground station, even though the Returns from the ground station transponder may be momentarily lost.

Another object of the invention is to provide a unique circuit means for reception and filtering of audio signals from a ground station transponder.

Other and further objects of the invention, together with the features of novelty appurtenant thereto, will appear in the course of the following description.

In the accompanying drawings which form a part of the specification and are to be read in conjunction therewith, and in which like reference numerals indicate like parts in the various views:

FIG. 5 is a block diagram showing both the Motor Control section and the combination Pulse Modulator and Power Supply section;

FIG. 7 is a block diagram of the Operation Circuit Board and the three Range Circuit Boards (the 1/10 Mile Range Circuit Board, the One (1) Mile Range Circuit Board and the Ten (10) Mile Range Circuit Board);

FIG. 13 is a circuit diagram of the quinary trigger circuit which directs a negative going waveform to the off transistor in the quinary circuit;

FIGS. 14a and 14b are diagrams including typical voltage-current values, of a saturated and an unsaturated transistor, respectively;

FIG. 15 is a plot of the various quinary waveforms as indicated therein;

FIG. 17 is a schematic diagram of the Ten (10) Mile Range Circuit Board shown in block diagram form in FIG. 1. It is significant to note that the 1/10 Mile and the One (1) Mile Range Circuit Boards are identical to the Ten (10) Mile Range Circuit Board;

FIG. 17a is a continuation of FIG. 17, connected as indicated, showing the readout coils associated with the Ten (10) Mile Range Circuit Board;

FIG. 19 is a view of a simulated counter register used in the shift register analogy;

FIG. 20 is a plot of the Trigger Waveforms showing therein typical Trigger intervals used in the counting system;

FIG. 25 is a plot of the Waveforms at critical points indicating a Zero Error Detection;

FIG. 26 is a plot of the Waveforms at critical points indicating an Add Error Detection;

FIG. 27 is a plot of various Waveforms (including Transmitter Interrogation) at critical points during an Add Error Interrogation;

FIG. 28 is a diagrammatic indication of how FIGS. 2–7 are to be relatively arranged and interconnected;

FIG. 29 is a schematic diagram showing a basic Monostable of the type used in the DME; and FIG. 30 is a plot of Waveforms at important points in the Monostable shown in FIG. 29.

Figure 23:
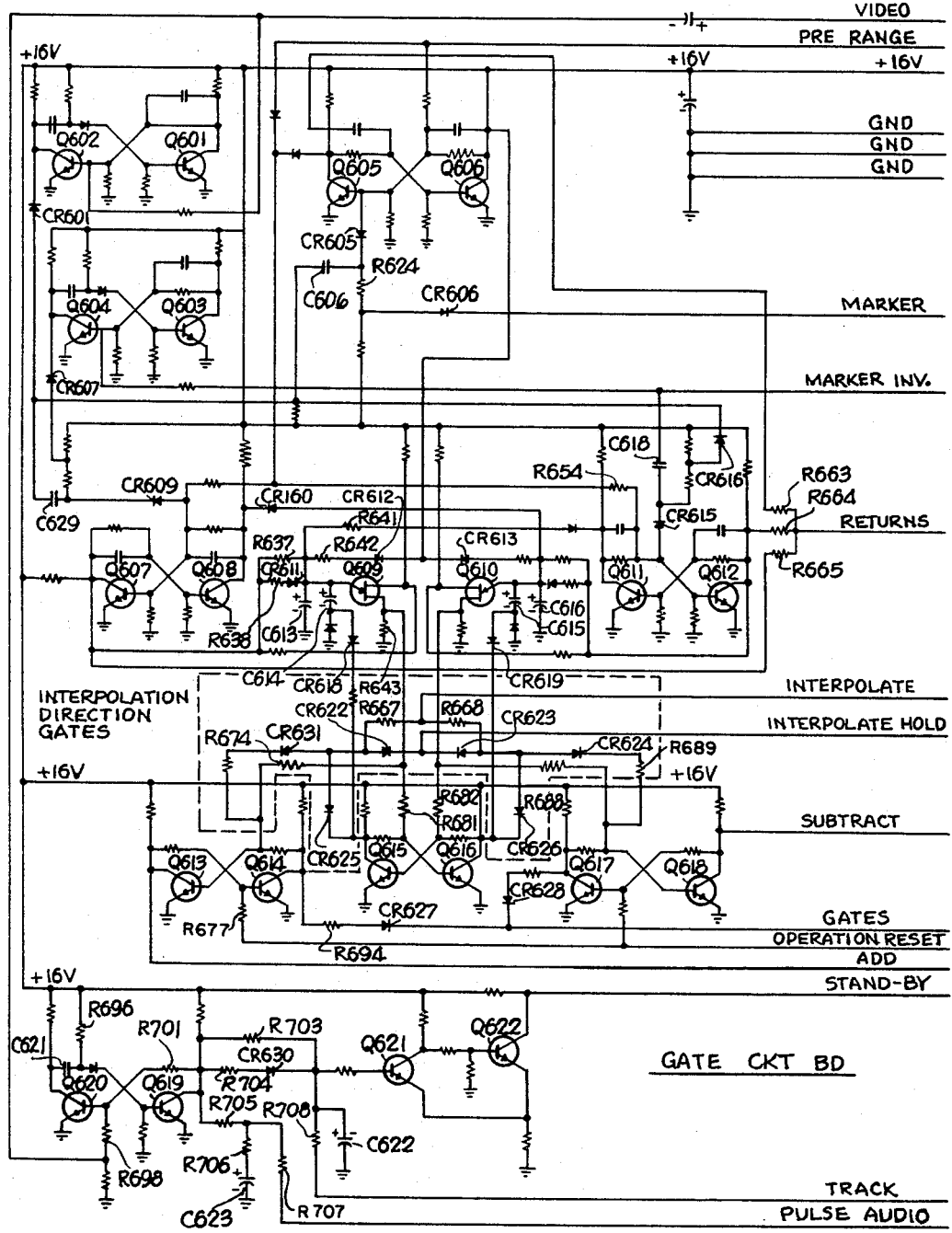
FIG. 23 is a schematic diagram of the Gate Circuit Board, said Circuit Board also shown in block diagram form in FIG. 6.

In the description the following prefixes aid in identification of the various circuit components: (1) Q—Transistors; (2) C—Capacitors; (3) CR—Diodes; (4) R—Resistors; and (5) L—Inductors.

To facilitate a general discussion of the functional operation of the DME, the principal subdivisions are shown in block diagram form in FIGS. 1–7. A more detailed description of these subdivisions will follow infra, however, a basic understanding of the cooperative interworkings of the various subdivisions is necessary in order to fully appreciate the over-all and individual inventive features disclosed hereinafter.

Of the principal subdivision shown in FIGS. 2–7 (note FIG. 28 for interconnection), the RF section, IF section, Pulse Modulator section and Motor Control section are disclosed in block diagram form only and do not represent significant parts of the invention other than cooperating with the various portions of the Video section to result in the operative unit. As a result thereof, the discussion on the above-mentioned sections will be limited to the functional block diagram shown in FIGS. 2, 3 and 5.

The generation of the transmitted RF pulses and the conversion of received RF pulses to the IF frequency of 63 mc. is accomplished by the RF unit. There are 100 different transmitter output frequencies, corresponding to VHF/VOR channels from 108.0 to 117.9 mc., which may be generated by summing one of eleven "mc." crystal frequencies and one of ten "tenth mc." crystal frequencies in a Mixer. This Mixer output frequency is multiplied by a factor of twelve by Doubler V104, Tripler V103, and a Final Doubler V101 to produce the UHF frequency that will be received by the DME ground station (see FIG. 2).

V106A is the High Frequency Oscillator and Q101 is the Low Frequency Oscillator. Outputs from both oscillators are coupled to the Mixer V106B. The plate circuit (not shown) of V106B is tuned to the mixed sum of the two oscillators. The mixed output is fed to the Amplifier V105 that raises the RF power to the level required by the next stage.

All tuned circuits, involved in the above-mentioned elements of the RF section, that change frequency with changes in channel frequency are tracked except the Low Frequency Oscillator itself. Four variable inductors (not shown) track the High Frequency Oscillator V106A, Mixer V106B, Amplifier V105, and the grids of Tripler V103. The variable inductors are ganged to a Megacycle Selector shaft (represented by the broken lines) that has eleven positions, one for each high frequency crystal. Thus, these circuits are tracked for each change in the High Frequency Oscillator, but not for Low Frequency Oscillator changes. The output circuits of the Final Doubler V101, a portion of Tripler V103 and the Receiver Preselector circuits are tracked by variable glass capacitors.

DME channels are allocated so that the airborne transmitting frequency is always 63 mc. away from the airborne receiving frequency. On DME channels corresponding to VOR frequencies of 108.0 to 112.2 mc., the airborne receiver's frequency is below the airborne transmitter's frequency. With VOR frequencies of 112.3 to 117.9 mc., the reecived DME frequency is above the transmitted frequency. This requires that, when changing from a VOR frequency of 112.2 mc to 112.3 mc., the Receiver Preselector tuning circuits must make a jump of 137 mc. This is accomplished by a camming arrangement that tunes the preselector glass capacitors. The Receiver Preselector tuned circuits provide two useful functions. They prevent passage of other than desired frequency signals, such as from other services operating in the UHF spectrum. They also prevent loss of transmitter power into the receiver, which would result in a drop in useful transmitter output and destruction of the mixer diode. Although both the receiver and transmitter portions of the RF unit are coupled to common antenna A, high selectivity of all the tuned circuits precludes loss of one's energy to the other.

Since the airborne transmitter is always 63 mc. above or below the received frequency, depending on the particular channel in use, it conveniently follows that the same freqeuncy transmitted qualifies for use as local injection for a receiver mixer. This results in an IF of 63 mc. RF power required for the receiver mixer is, of course, much less than full transmitting power. Thus, while the High Frequency Oscillator V106A and Mixer V106B run at the same power level for both functions, later stages of the transmitter run at a low level while supplying mixer injection and then are pulsed to a much higher level during the short times of RF pulse transmission.

At RF pulse transmission times, an 800 volt positive pulse at 20 microsecond duration is superimposed on the DC voltages to generate the high RF drive level fed to the Final Doubler V101. The Final Doubler receives plate power in the form of a pair of positive high voltage pulses of 3.5 microsecond width and 12 microsecond spacing between their leading edges. These 1400–1800 volt pulses are timed so as to occur at the instant transmitted RF energy is desired. At all other times the plate voltage of V101 is zero. A small amount of RF energy at half the transmitter output frequency is generated at V103 for receiver mixer injection. Since V101 is also coupled to V103, a 14 volt reverse bias voltage is present to eliminate the possibility of any RF energy being fed through V101 and radiated during receiving. High RF drive power from V103 during RF pulse transmissions easily overcomes this back bias and drives V101 into heavy conduction.

As mentioned above, antenna A is a common antenna for both the receiver and the transmitter portions of the RF section. After passing through the Receiver Preselector, received RF pulses from the DME ground station are sent to a Mixer diode CR101. Tripler V103 supplies diode CR101 with RF energy at half the required mixer injection frequency. CR101 doubles this drive frequency and at the same time mixes the resulting doubled frequency with signals from the Preselector. The difference frequency, 63 mc., is coupled to V102, the IF Preamplifier. As Tripler V103's output level is many times higher when pulsed for transmission, the drive to diode CR101 could possibly approach damaging levels. Diode CR102 is connected in such a manner to short out the drive to diode CR101 when Tripler V103 is pulsed. A positive pulse from the Suppressor pulse output of the Pulse Modulator section is applied to diode CR102's anode. This reduces diode CR102's resistance to a very low value and effectively shorts out the high drive.

The 63 mc. output from diode CR101 is amplified before leaving the RF section by the IF Preamplifier V102. The IF section receives pairs of 63 mc. pulses from the IF Preamplifier and the RF section. A single decoded video output pulse results for each properly coded pair of input IF pulses.

The IF section performs three primary tasks: (1) amplification of pulses of proper frequency, (2) rejection of off-frequency pulses and (3) the generation of one DC output pulse for each pair of properly spaced received pulses. Since there is no gain in this particular receiver at the UHF-DME channel frequencies, all receiver gain must be developed at IF frequencies.

Q301, an input transistor in the IF section, is part of an IF amplifier which amplifies the 63 mc. pulses. The gain of Q301 is controlled by an AGC voltage (Q311) applied thereto. Since frequency selectivity sufficient to reject an adjacent DME channel one megacycle away is difficult to achieve at an IF frequency of 63 mc., adequate rejection is realized by mixing the first IF frequency of 63 mc. with a local oscillator of 71.47 mc. to obtain a second, lower IF frequency at 8.47 mc. Tuned circuits of 8.47 mc. provide the required selectivity.

The 71.47 mc. voltage is generated by a transistor Crystal Oscillator, Q303. The 71.47 mc. output from Q303 is applied to the emitter of Mixer transistor Q302. The 63 mc. pulses from IF Amplifier Q301 mixed with the 71.47 mc. output from Q303 results in pulses of 8.47 mc., the difference frequency, at the output of Mixer Q302. There is also a considerable conversion gain realized in Q302 with the 8.47 mc. output considerably greater than the 63 mc. input.

Q304, Q305 and Q306 are the 8.47 mc.-IF amplifier stages that provide most of the receiver's gain and selectively. AGC voltage to Q304 and Q305 controls their gain with variations in received signal level.

Detection of 8.47 mc. pulses and amplification of the resulting DC pulses occurs in the second Detector Q307.

Development of a single negative pulse for each properly spaced pair of received pulses and inhibiting of receiver output pulses at DME or transponder RF pulse transmission intervals occurs in the Decoder Q308, Q309 and Delay Line DL301. No decoded output can be generated by meaningless signals, such as CW or pulses having other than the required 12 microsecond spacing. Due to the series arrangement of the collector and emitter circuits of Q308 and Q309, both must receive positive base drive at the same time to provide an appropriate current path. Positive pulse pairs with 12 microsecond spacing from Detector Q307 are presented to Q309 with no delay, however, Delay Line DL301 causes a 12 microsecond delay in the pulse pair's arrival at Q308. Therefore, the first pulse turns on Q309, but since the first pulse must travel through Delay Line DL301 to reach Q308, Q308 is not yet turned on and no current can flow. If the pulse spacing of the received pulse pair matches the delay through DL301, the second pulse of the pair will turn on Q309 at the same instant that the first pulse delay by Delay Line DL301 turns on Q308. Under these conditions with Q308 and Q309 turned on simultaneously, a resultant voltage will drop to form a negative pulse. 12 microseconds later, the second pulse will arrive at Q308, but since at this time there is no pulse drive at Q309, no Decoder pulse is generated.

The Pulse Blanker transistor Q313 disables the decoder by shorting out base drive to Q309. A positive pulse from the Suppressor pulse output of the Pulse Modulator or from a transponder, if connected, will turn on Q313, causing its collector to emitter resistance to drop to a very low value. This prevents meaningless outputs by the IF section at DME or transponder RF pulse transmission times. When Q313's base is not driven, its collector to emitter resistance is extremely high and has no effect on normal decoder performance.

Pulse amplifier Q310 receives the negative decoded output pulses as base drive. These drive transistor Amplifier Q310 into saturation so that the voltage at the output test point approaches +20 supply voltage for the duration of the decoded pulse. This is the decoded receiver output pulse that is supplied to the Video section.

The primary function of the Pulse Modulator is to furnish short high energy pulses to the DME transmitter. Pulse wave forms from the Modulator are also used to disable the DME receiver and a transponder, if installed on the aircraft, during the instant of pulse transmission by the airborne DME.

Silicon controlled rectifiers (SCR) are solid state equivalents to gas-filled thyratrons. When the gate terminal corresponding to the grid of a thyratron, is made positive with respect to the cathode by a volt or so, the anode to the cathode resistance drops to an extremely low value. This low resistance path allows the flow of the large current required to develop high energy pulses. Once the SCR starts to conduct, it will continue to do so even though the signal applied to the gate terminal has ended, until the current flow between the cathode and anode has been reduced to a very low value. At this time, the SCR "turns off" with the anode to cathode resistance becoming very high until the next positive gate signal is applied.

Three different pulse wave forms are generated by the Pulse Modulator. One wave form has about 20 microseconds duration with a peak voltage of approximately +800 volts. This wave form is supplied to drive stages in the transmitter at pulse transmission time. The second wave form has the same shape and time of occurrence as the first, but its amplitude is approximately +80 volts. It is used to control certain DME receiver and transponder functions as noted above. The third wave form consists of a pair of positive +1800 volt pulses, 3.5 microseconds wide with 12 microseconds spacing between their leading edges at the 50% point. This wave form occurs simultaneously with the 20 microsecond pulse and is applied to the Final Doubler V101 in the RF section. All these pulse wave forms recur at a rate of 150 per second in the search and approximately 30 per second in the track mode when triggered by a signal from the Initiation Board of the Video section. Since all modulator wave forms are derived from unregulated power supply voltages, their voltages will follow variations in primary power applied to the DME.

The 20 microsecond pulses are generated by the discharge of a Pulse Forming Network. When SCR201 is triggered into conduction by a pulse from the Initiation Board in the Video section, energy stored in the Pulse Forming Network discharges. The +150 volts applied to V103, V104 and V105 in the RF section passes through the Pulse Forming Network. Suppressor pulses delivered to the IF section and RF section are likewise emanating from the Pulse Forming Network.

As mentioned above, two 3.5 microsecond, high voltage pulse outputs, are required from the Pulse Modulator to develop the double pulse of the transmitter output power for each trigger pulse from the Initiation Board of the Video section. The 3.5 microsecond pulse is generated in the Pulse Shaping Network, with cooperation of the second Pulse Generator SCR202, the Pulse Shaping Network (12 microseconds) and a proper supply voltage from the Power Supply Section. It is again stressed that there are several ways of and methods for forming pulses and dictating the proper spacing between same and what is shown in the Pulse Modulator section is merely a generalized block diagram of such a possible circuit.

The Motor Control section facilitates the selection of the transmitter frequencies. The Megacycle and Kilocycle tuning motors, M101 and M102, respectively, are actuated by the Motor Control section. The motors operate on +28 volt DC from the power supply rather than directly from the A+ input line.

Frequency selection is made by grounding two out of five control wires according to the standard ARINC two out of five coding. With two wires grounded, the motor associated with the set of five will be caused to run until it finds a Wafer Switch position that breaks connection between these two wires and the motor control. Only one wafer position exists that meets this requirement for a given selected frequency.

If, for example, a new Kilocycle selection has been made, a ground condition will exist due to a path through the wafer switch that turns on Q1102, the kc. motor switch. Q1102 conducts, essentially grounding the negative terminal of Kilocycle Motor M102. Q1104 (kc. motor damping transistor) is off during this time as its base is grounded. Motor M102 will run, turning the tuning shaft on the RF unit through a Geneva gear reduction until the Motor control wafers are in such a position that both grounded wires are disconnected from the input lines. When this happens, the input line returns to 28 volts and Q1102 turns off. Q1104 then turns on, effectively shorting out the self-generated EMF of the now free wheeling motor and rapidly brings it to a halt. Reset diodes CR1101 and CR1102 facilitate in the turning on of motor switches Q1101 and Q1102, respectively. Note the Memory Reset Line running from the reset diodes to the Zero Reset Binary (Initiation Circuit Board).

The Video section consists of six functionally separable but interacting subsystems, hereinafter referred to as the Initiation Circuit Board, Gate Circuit Board, Operation Circuit Board, 1/10 Mile Range Circuit Board, One Mile Range Circuit Board and the Ten Mile Range Circuit Board (see FIGS. 4, 6, 7, 17, 18, 21 and 28). All the logical decisions involving searching or tracking a ground station are made in this section.

Figure 1:
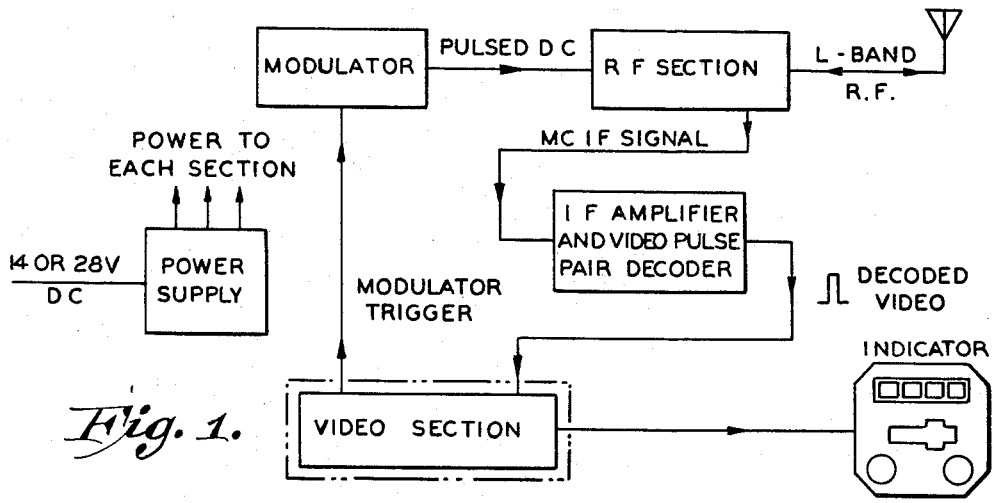
FIG. 1 is a block diagram showing the various important subdivisions of the DME.

As is indicated in FIG. 1, the only information required by the Video section is decoded video. These are single pulses representing replies and "squitter" (Random pulse pairs initiated by the ground station to maintain AGC operation in the airborne receiver) from the ground station. It should also be noted that the transmitter modulator is slaved or commanded to fire by the Video section.

The general function of the Video section is to measure the time interval between the interrogation of the ground station by the DME and the reception of a *valid* reply, otherwise known as a Return, from the ground station. The Video section will then cause to be visually displayed, a distance in nautical miles on an indicator to the pilot, said distance having been determined by the propagation time of a radio wave on this round trip path.

Due to the fact that the ground station is replying to other aircraft in the area, and is also producing "squitter" as previously mentioned, it is not immediately evident to the DME which replies are answers to its interrogation and which are meaningless. Accordingly, the Video section must "search" for a point in time, occurring after each interrogation, at which replies consistently occur.

Figure 8:
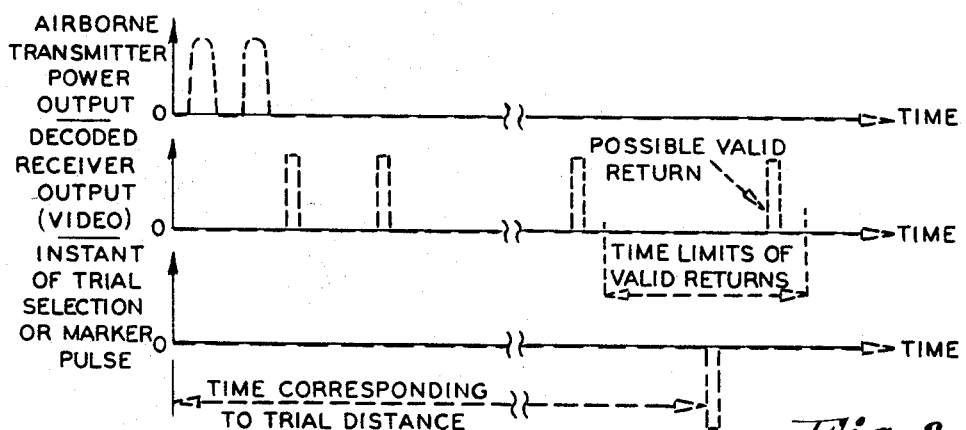
FIG. 8 is a plot of the search cycle waveform.

When in the search mode of operation, the Video section makes a trial solution of distance (time) and compares the reply for agreement in time (distance) with this trial solution or number. There are three basic events or pulses which are of immediate concern, e.g., the airborne transmitter output interrogation pulse, the decoded receiver output (video) and the instant of trial selection or Marker pulse. These three vents are diagrammatically represented in FIG. 8. If no Return falls within the boundary or limits of the trial solution (indicated by the broken lines in the plot of received video vs. time), the video section advances the trial solution by 0.2 nautical mile at the end of that cycle (before the next interrogation). Since each *round trip* tenth nautical mile (at the speed of light or a radio wave through space) corresponds to a propagation time of 1.2364 microseconds, a new trial solution or time of the Marker pulse, will correspond to about 2.5 microseconds ($2 \times 1.236$ microseconds) later than the previous cycle.

If during any interrogation cycle, a received reply falls within the limits of the trial solution, the unit holds the stored number and waits at that same time (distance) for the next several interrogation cycles. If a reply falls consistently in this time zone for six cycles or so (depending on the percentage reply) the reply is identified as a valid one, e.g., a Return, and a unit stops the search and goes into what is known as the "track" mode. If the reply was not consistent, the unit considers it to have been random or not meaningful with its own interrogation. The unit then continues to search out in distance for a time zone of correlation between interrogation and reply.

The accuracy determining element for all timing functions is a crystal oscillator or "clock" on the Initiation Board (Video Section) running at a frequency of 1.617 megacycles per second. The oscillator output is divided by 2, by a binary or flip-flop, thereby resulting in a frequency of 808.78 kilocycles, the time per cycle thusly corresponding to a period of 0.1 round trip nautical mile.

After the transmitter interrogates, the unit waits for a period of time corresponding to the ground station delay, plus internal system delays and feeds the "crystal-derived" clock pulses into a series of digital counting and storage registers. A Marker pulse is derived from the memory registers as they count the clock pulses. The Marker pulse will then represent the total time required to convert a predetermined number in the storage registers into a time interval *by that number* of precise 0.1 nautical mile clock pulses. The Marker pulse can then be compared in time with the received signal and continuously corrected to coincide with it. When this is done, the stored number that the Marker was derived from represents the distance to the ground station.

To better understand both how the Marker pulse is obtained and its relationship with the DME system, a detailed discussion of the unique digital counting and memory circuits, including prior art systems, follows hereinafter.

Figure 9:
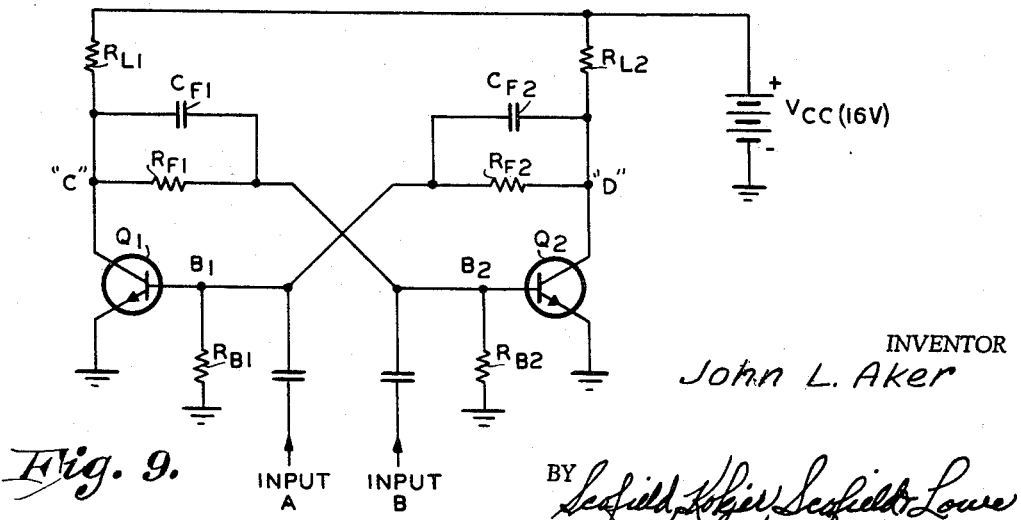
FIG. 9 is a schematic diagram of a basic binary circuit.

First, consider the basic binary counter shown in FIG. 9. This circuit will rest in either one of two stable states. When triggered by an input pulse, the circuit switches to the second stable state where it remains until triggered by another pulse.

When a transistor is cut off, its output resistance is high and its collector current is effectively zero. However, current flow through the voltage divider network (resistors $R_{L1}$, $R_{F1}$ and $R_{B2}$), because of collector supply voltage $V_{cc}$ (+16 volts) causes finite voltage drops across each resistor. The voltage drop across resistor $R_{L1}$ is 1.4 volts, leaving nearly the full value of supply voltage $V_{cc}$ at point "C." The voltage drop across resistor $R_{F1}$ is 14 volts, allowing for a base turn-on drop across $Q_2$ of +0.6 volt. $Q_2$ is then driven on by a base current of $I = 14/R_{F1} = 1.4$ ma. The high collector current (saturation) of the on transistor flows through resistor $R_{L2}$ and causes a voltage drop equal to the supply voltage $V_{cc}$, so that at point "D," the voltage is essentially zero (0.2 volt or less).

Division of this voltage by resistors $R_{F2}$ and $R_{B1}$ results in 0.1 volt or less at $Q_1$'s base. Although this is not a negative voltage, it may be thought of as reverse bias since a silicon transistor requires roughly 0.6 volt forward base to emitter voltage to conduct any appreciable collector current. Thus transistor $Q_1$ is held at cutoff.

The application of a negative trigger pulse to the base of the on transistor or a positive pulse to the base of the off transistor will switch the conducting state of the circuit. In the higher speed logic circuits of the invention, as will be discussed, negative *going* waveforms are generally used as triggered information. This is because negative going waveforms are derived from the collectors of transistors turning "on" and pulling a circuit point from $+V_{cc}$ to ground, and are thus sharper and of lower impedance than waveforms derived from transistors turning "off" (positive going).

Two separate inputs are shown in FIG. 9. A trigger pulse of the proper polarity at input A can change the state of the circuit. Once the state of the circuit is changed, an input of the same polarity at input B or an input of opposite polarity at input A will again change the state of the circuit.

Assume that transistor $Q_1$ is cut off and transistor $Q_2$ is conducting. A negative trigger pulse applied at input B reduces the base voltage of $Q_2$ to ground or below. $Q_2$ begins to turn off and the loss of collector current in $Q_2$ causes the voltage to increase toward $V_{cc}$.

This change in voltage is coupled through capacitor $C_{F2}$ to the base of transistor $Q_1$ which increases its base to emitter voltage. As $Q_1$'s base voltage rises, $Q_1$ begins to draw collector current which reduces its collector voltage from near $V_{cc}$ to a value nearer ground. This decreasing collector voltage is coupled through capacitor $C_{F1}$ to further decrease the base current and voltage of $Q_2$. This regenerative feedback continues until transistor $Q_1$ is in saturation and transistor $Q_2$ is cut off.

The output, taken between collector and ground, is a unit step voltage when one trigger is applied. A square-wave output could be obtained through continuous pulsing or triggering of alternate inputs.

Figure 10:
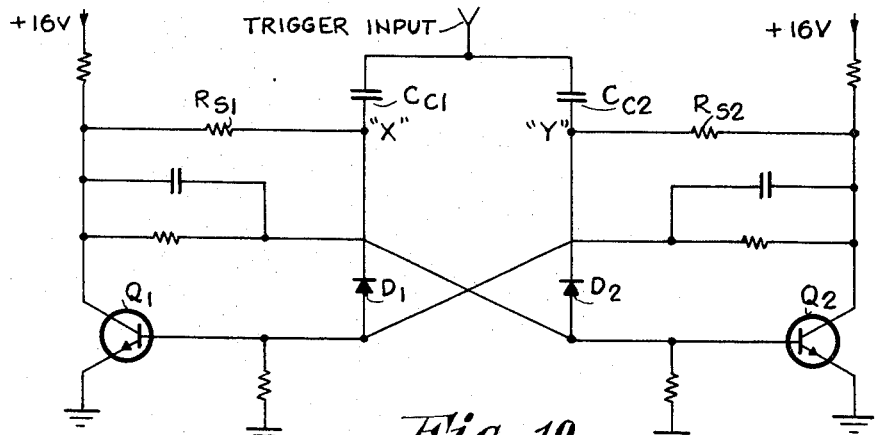
FIG. 10 is a schematic diagram of the basic binary circuit used in the DME with a steering network added.

Frequency division by a factor of 2 may be obtained if the two inputs are properly combined at one point and driven by a common trigger. To cause a change of state with a common input trigger, a steering circuit composed of resistors $R_{s1}$ and $R_{s2}$ and diodes $D_1$ and $D_2$ is added. See FIG. 10.

This circuit now responds to negative *going* waveforms only, as diodes $D_1$ and $D_2$ will only conduct negative voltages to the bases of $Q_1$ and $Q_2$.

Again assume $Q_1$ off and $Q_2$ conducting. Since $Q_1$ is off, its collector voltage will be high and $C_{c1}$ will charge through $R_{s1}$ so that the voltage at point "X" (FIG. 10) equals nearly $+V_{cc}$. Similarly, the collector of $Q_2$ and point "Y" will be essentially at ground potential.

If the input signal (for example, from another binary) which was resting at $+V_{cc}$ suddenly changes level to ground potential, this *change* in level is momentarily coupled through capacitors $C_{c1}$ and $C_{c2}$ to points "X" and "Y." The voltage at "X" then goes from $+V_{cc}$ to nearly ground. As this level is not lower than the voltage at the base of $Q_1$, diode $D_1$ does *not* conduct and no signal is coupled to $Q_1$. At "Y," however, the voltage was initially near ground and the coupled change in voltage pulls "Y" below ground to a negative voltage. This negative voltage condition forward biases $D_2$ and removes drive from the base of $Q_2$ (the on transistor). $Q_2$ turns off and the circuit switches state as previously mentioned so that $Q_1$ is on and $Q_2$ is off.

Point "X" will go to ground potential and point "Y" will rise to nearly $+V_{cc}$ so that the next negative going pulse trigger will always be steered to the base of the "on" transistor.

The circuit switches states for each negative going input trigger, and at either collector a negative going output or "carry" is available for every second input trigger.

The quinary counter

Figure 11:
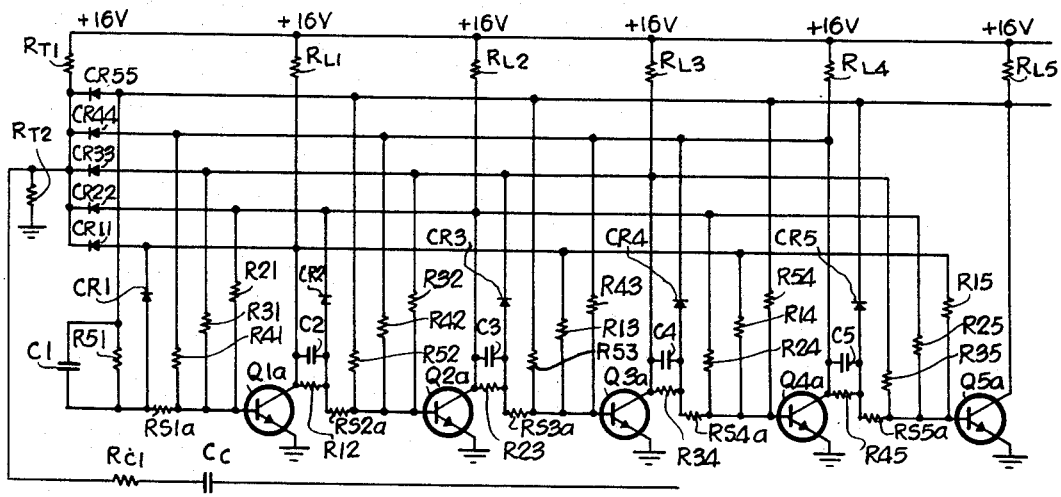
FIG. 11 is a schematic diagram of the quinary counter circuit.

The quinary counter (FIG. 11) is a circuit made up of five transistors ($Q_{1a}$, $Q_{2a}$, $Q_{3a}$, $Q_{4a}$ and $Q_{5a}$) and has five stable states rather than two, as in the binary counter.

A stable state for this configuration is with one transistor off and the other four on. A total of five stable states then exist, depending on which transistor is off. Note that each base connects to the collector lines of the other four transistors through base drive resistors. Thus the collector line of each transistor drives the bases of the other four transistors. For example, resistors $R_{51}$, $R_{52}$, $R_{53}$ and $R_{54}$, connect the collector of $Q_{5a}$ to the base of $Q_{1a}$, $Q_{2a}$, $Q_{3a}$ and $Q_{4a}$, respectively. The collector of $Q_{4a}$ connects the bases of $Q_{1a}$, $Q_{2a}$, $Q_{3a}$ and $Q_{5a}$ through resistors $R_{41}$, $R_{42}$, $R_{43}$ and $R_{45}$, respectively. The collector of $Q_{3a}$ connects the bases of $Q_{1a}$, $Q_{2a}$, $Q_{4a}$ and $Q_{5a}$ through resistors $R_{31}$, $R_{32}$, $R_{34}$ and $R_{35}$. Similarly, $R_{21}$, $R_{23}$, $R_{24}$ and $R_{25}$ connect $Q_{2a}$ to the remaining transistors just as $R_{12}$, $R_{13}$, $R_{14}$ and $R_{15}$ connects with $Q_{1a}$.

Note also that capacitor $C_1$ couples the collector of $Q_{5a}$ to the base of $Q_{1a}$ and that capacitors $C_2$, $C_3$, $C_4$ and $C_5$ couple the collectors of $Q_{1a}$, $Q_{2a}$, $Q_{3a}$ and $Q_{4a}$, respectively, to the base of the next succeeding $Q_{2a}$, $Q_{3a}$, $Q_{4a}$ and $Q_{5a}$, respectively. Resistors $R_{s1a}$, $R_{s2a}$, $R_{s3a}$, $R_{s4a}$ and $R_{s5a}$ are respectively connected in the base circuits of the transistors, e.g., $R_{s1a}$ to $Q_{1a}$, $R_{s2a}$ to $Q_{2a}$, $R_{s3a}$ to $Q_{3a}$, $R_{s4a}$ to $Q_{4a}$ and $R_{s5a}$ to $Q_{5a}$.

Figure 12:
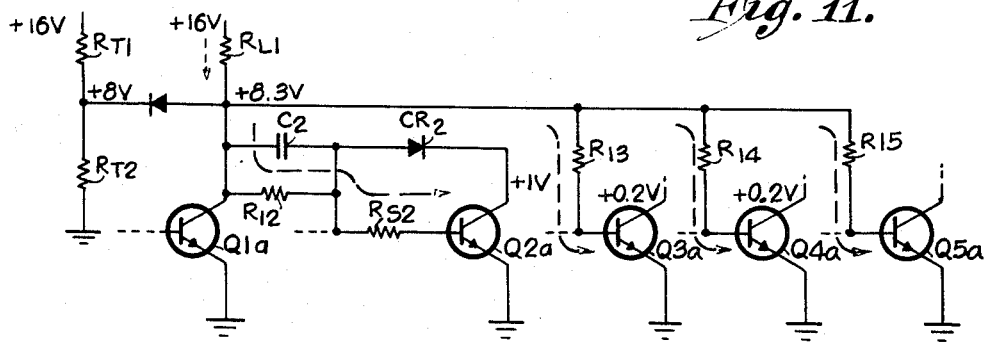
FIG. 12 is a partial schematic diagram of the collector circuits of the counter shown in FIG. 11.
Figure 4:
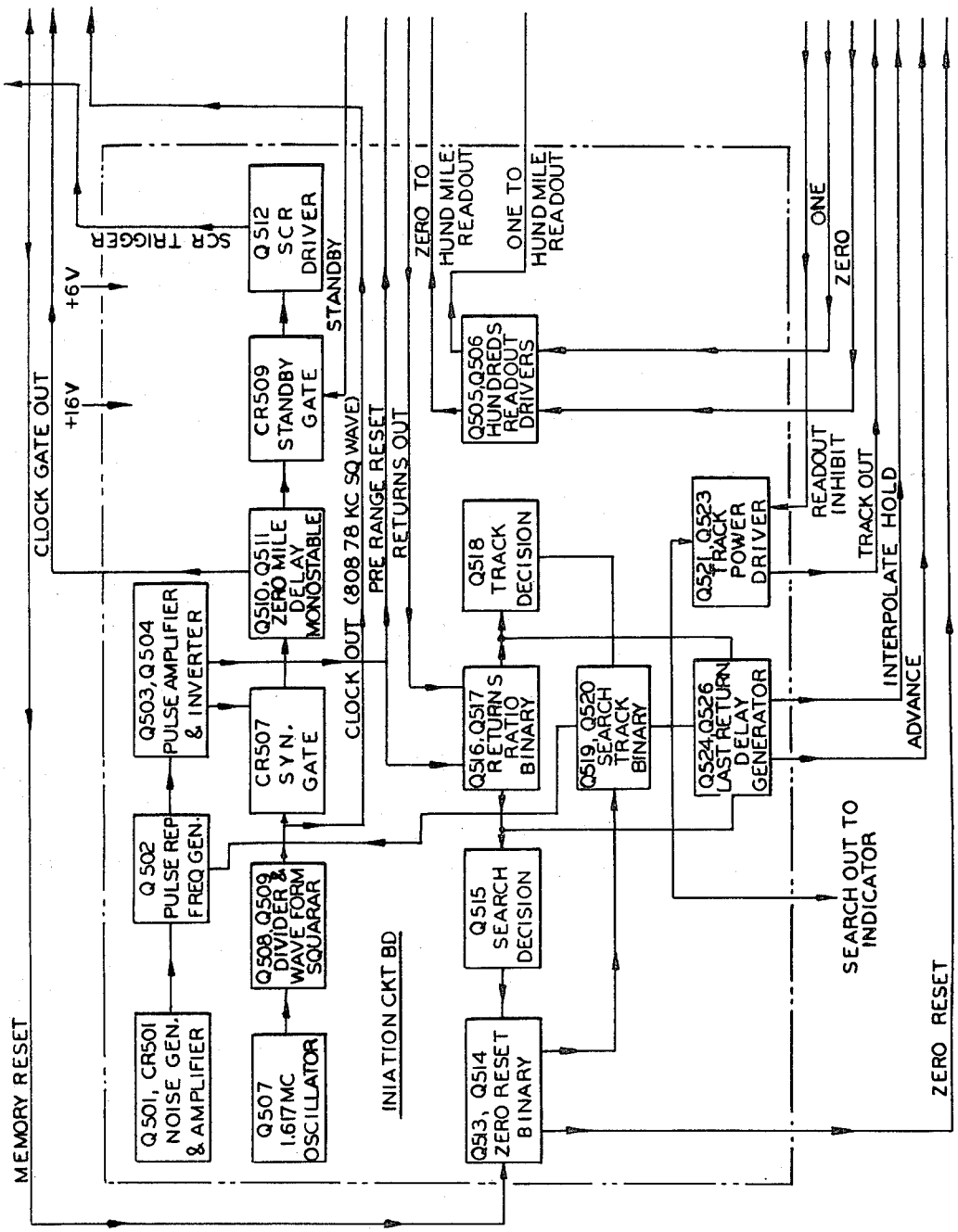
FIG. 4 is a block diagram of the Initiation Circuit Board.

Assume $Q_{1a}$ to be turned off and note FIG. 12.

The high collector voltage of $Q_{1a}$ drives the bases of $Q_{2a}$, $Q_{3a}$, $Q_{4a}$ and $Q_{5a}$ by means of the current paths shown by the arrows, thus holding these transistors in the on condition. The base of $Q_1$ connects, through its four base drive resistors $R_{21}$, $R_{31}$, $R_{41}$ and $R_{51}$ to the collectors of $Q_{2a}$, $Q_{3a}$, $Q_{4a}$ and $Q_{5a}$, respectively (see FIG. 11). These collectors being on, are all at low potential and the base of $Q_{1a}$ is not driven. Therefore, $Q_{1a}$ remains off and a stable condition exists.

When a negative going input trigger is applied through capacitor $C_c$ and resistor $R_{c1}$, the circuit will change stable states so that $Q_{2a}$ is off and $Q_{1a}$, $Q_{3a}$, $Q_{4a}$ and $Q_{5a}$ are on.

This progression will continue from left to right until, on the application of the fifth trigger pulse, $Q_{5a}$ will turn on again and $Q_{1a}$ will be triggered off, restoring the quinary to its original state. In this circuit, collector triggering is used to shift the state, rather than base triggering. The negative going trigger waveform is coupled through $C_c$ to the junction of $R_{T1}$ and $R_{T2}$. Diodes $CR_{11}$, $CR_{22}$, $CR_{33}$, $CR_{44}$ and $CR_{55}$ in combination with $R_{T1}$ and $R_{T2}$ form a steering network which directs the trigger to the off transistor (see FIG. 13).

In the example, since $Q_{1a}$ is off, its collector voltage will be high and diode $CR_{11}$ will be slightly forward biased toward the 8 volt nominal voltage of the voltage divider formed by resistors $R_{T1}$ and $R_{T2}$. The other steering diodes are connected to on transistors and are thus reverse biased. As the input trigger reduces the steering junction voltage toward ground potential, the collector line of $Q_{1a}$ is forcefully pulled along by conduction through $CR_{11}$.

$Q_{2a}$ is the only transistor that is capacitively coupled (capacitor $C_2$) to the $Q_{1a}$ collector line; $Q_{3a}$, $Q_{4a}$ and $Q_{5a}$ are resistively coupled only (see FIGS. 11 and 12). The decrease of voltage on the $Q_{1a}$ collector line is coupled through capacitor $C_2$ to reduce the base drive of $Q_{2a}$ through $R_{s2}$.

$Q_2$ begins to turn off and its collector voltage rises toward a $+8$ volt level due to current through $R_{L2}$. (Note that resistors $R_{L1}$, $R_{L2}$, $R_{L3}$, $R_{L4}$ and $R_{L5}$ connect the collector of $Q_{1a}$, $Q_{2a}$, $Q_{3a}$, $Q_{4a}$ and $Q_{5a}$, to the $+16$ volt bus.) When this voltage rises to about $+3$ volts, $Q_1$ begins to receive appreciable base drive from the $Q_2$ collector line through resistor $R_{21}$. $Q_1$ begins to turn on and reduce its collector line voltage (up to this time the decrease in collector voltage of $Q_{1a}$ was due to the trigger pulse). The process, once started, continues regeneratively until $Q_{2a}$ is off and $Q_{1a}$ is on. $Q_{2a}$ is then without base drive and remains off as its base network is connected to four on transistors.

During the switching process, $Q_{3a}$, $Q_{4a}$ and $Q_{5a}$ are unaffected and remain on because the loss of base drive from the $Q_{1a}$ collector line is made up by an increase in drive from the rising $Q_{2a}$ collector line.

To additionally insure that $Q_{2a}$ will turn off first and assume the job of holding $Q_{1a}$, $Q_{3a}$, $Q_{4a}$ and $Q_{5a}$ on, the $Q_{2a}$ base circuit is such that $Q_{2a}$, when driven from the $Q_1$ collector line, will be conducting but unsaturated.

A saturated transistor is one in which the base drive current is more than sufficient to cause the collector current to be entirely limited by external circuit resistance, i.e., suppose the transistor in FIG. 14a has a current gain "Beta" of 30 and that the collector current through $R_L$ with the transistor fully on is 3 ma. No matter how large the base drive, the transistor can pull no more than 3 ma. through $R_L$. Any base drive then, above the requirement 3 ma./30=0.1 ma., is a margin and if, say 0.5 ma. is available, the transistor is said to be saturated.

A base circuit is shown modified in FIG. 14b by the addition of a resistor $R_s$ and diode CR. The diode is connected between the tap on the base drive resistance and the collector. When the collector voltage falls below the voltage at the tap, the diode conducts and diverts base current into the collector. Once the collector voltage reaches this low value, the base current is reduced to whatever value is necessary to maintain the collector current, and the transistor is said to be on but unsaturated as there is no excess of base drive.

A saturated transistor shows a longer turn off time than an unsaturated one. The condition of excess base drive and minimum collector voltage causes a storage effect. This is seen as a time delay between the time when base drive is removed and the time the collector current begins to decrease.

Referring back to the quinary circuit with $Q_1$ off (FIG. 12), it can be seen that $Q_{2a}$ is on but unsaturated as excess base drive is shunted from $R_{S2a}$ by diode $CR_2$. $Q_{3a}$, $Q_{4a}$, and $Q_{5a}$ are saturated as their base drive from $Q_{1a}$ does not pass through a nonsaturating path. (Further note that diodes $CR_1$, $CR_3$, $CR_4$ and $CR_5$ shunt resistors $R_{S1a}$, $R_{S3a}$, $R_{S4a}$ and $R_{S5a}$, respectively, in a similar manner with similar results.)

Thus $Q_{2a}$, in addition to being capacitively coupled to $Q_{1a}$ is unsaturated when driven by an off $Q_{1a}$ and is "made ready" to turn off in preference to $Q_{3a}$, $Q_{4a}$ and $Q_{5a}$.

The same situation applies to $Q_{3a}$ when driven by $Q_{2a}$, etc., through $Q_{1a}$ driven by $Q_{5a}$.

The combination of a binary and a quinary circuit gives a biquinary or scale of ten counter. Shown within broken line portion of FIG. 17 is a range board count biquinary. The binary (Q921 and Q922) furnishes to the quinary (Q929–Q933) a negative-going output at Q921 for every second input trigger. The quinary provides a negative going output or "carry" at the collector of Q933 for every fifth binary output. The following chart describes the states of each transistor at the end of each negative-going input.

| Pulse | Q921 | Q922 | Q929 | Q930 | Q931 | Q932 | Q933 |
|---|---|---|---|---|---|---|---|
| 0 | On | Off | Off | On(ns) | On | On | On |
| 1 | Off | On | Off | On(ns) | On | On | On |
| 2 | On | Off | On | Off | On(ns) | On | On |
| 3 | Off | On | On | Off | On(ns) | On | On |
| 4 | On | Off | On | On | Off | On(ns) | On |
| 5 | Off | On | On | On | Off | On(ns) | On |
| 6 | On | Off | On | On | On | Off | On(ns) |
| 7 | Off | On | On | On | On | Off | On(ns) |
| 8 | On | Off | On(ns) | On | On | On | Off |
| 9 | Off | On | On(ns) | On | On | On | Off |
| 10 | On | Off | Off | On(ns) | On | On | On [1] |

[1] Carry pulse at this time.
(ns): nonsaturated.

The Schmitt trigger

Figure 16:
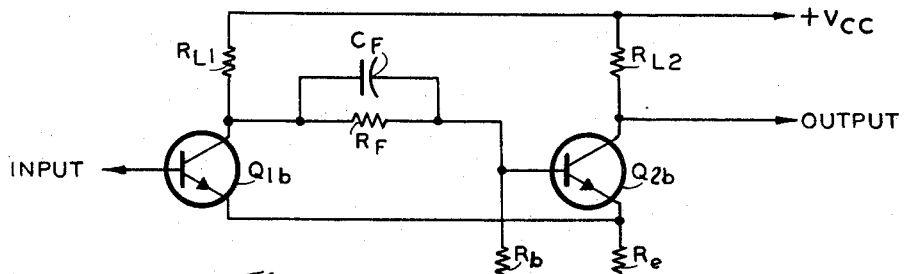
FIG. 16 is a schematic diagram of a basic Schmitt trigger circuit.

The Schmitt circuit (FIG. 16) differs from the conventional binary circuit in that one of the coupling networks is replaced by a common emitter resistor. This provides regenerative feedback while leaving one collector and one base free and independent for output and input considerations.

Assuming a quiescent condition (no input) with transistor $Q_{1b}$ at cutoff, the collector voltage of $Q_{1b}$ is nearly equal to the supply voltage $V_{cc}$. This positive voltage is coupled to the base of transistor $Q_{2b}$ through resistor $R_f$.

Current, flowing from the emitter of transistor $Q_{2b}$ through the common emitter resistor $R_e$, holds the emitter of $Q_{1b}$ at a positive potential with respect to its base and maintains it in a cutoff condition. The high positive voltage at the base of $Q_{2b}$ produces forward bias for its base emitter junction causing it to operate in the saturation region.

A positive signal of sufficient amplitude applied to the base of $Q_{1b}$, will allow $Q_{1b}$ to conduct, causing the collector voltage to decrease. This change is coupled through $C_f$ and $R_f$ to the base of $Q_{2b}$. The emitter current of $Q_{2b}$ decreases, lowering the potential across resistor $R_e$. The emitter of transistor $Q_{1b}$ becomes less positive, reducing the reverse bias and increasing collector current. This regenerative action continues until transistor $Q_{1b}$ is operating in the saturation region and transistor $Q_{2b}$ is cut off. The output is a high positive voltage.

This new condition continues until the input begins to fall (becoming more negative). This negative going input decreases the base potential of transistor $Q_{1b}$ reducing its forward bias. This causes the collector voltage to increase, emitter current to decrease, and the potential across resistor $R_e$ to decrease. Simultaneously, the increasing (positive) voltage at the collector of transistor $Q_{1b}$ is coupled to the base of transistor $Q_{2b}$ driving it positive. The decreasing voltage of resistor $R_e$, due to $Q_{1b}$ being cut off, causes the emitter of $Q_{2b}$ to become less positive. Both actions tend to increase the forward bias of the emitter to base junction and $Q_{2b}$ again operates at saturation, cutting off transistor $Q_{1b}$ and returning the circuit to its original operating conditions. The output is a low positive voltage.

The rise and fall time of the output wave of this circuit is shorter than that of the conventional binary circuit. The shape of the output waveform does not depend on the shape of the input waveform. The output waveform changes between its two values of output voltage only when the input waveform passes through the switching points of the circuit.

The monostable or one-shot operation

A monostable circuit is one which, when triggered by a short pulse, generates a longer pulse, the width and amplitude of which may be controlled by the circuit design. A typical monostable circuit is shown in FIG. 29. A stable state for the circuit in FIG. 29 exists with $Q_{1M}$ on (saturated) due to the base current from the $+V_{cc}$ line through the resistor $R_{TM}$. $Q_{2M}$ will be off as its base drive must come from resistor $R_{FM}$ which is connected to the collector of $Q_{1M}$, same being at essentially ground potential.

Capacitor C will charge through $R_{L2M}$ to $+V_{cc}$, positive as indicated. When $Q_{1M}$ is turned off by the trigger input, $Q_{2M}$ turns on because of the change in $Q_{1M}$'s collector voltage. $Q_{1M}$ is initially reverse biased by a base-emitter voltage equal to $V_{cc}$ and remains off until the capacitor C loses its charge allowing the base of $Q_{1M}$ to go slightly positive. Note that the capacitor potential starts at $V_{cc}$ and would eventually charge to $V_{cc}$ of the opposite polarity were it not for the switching occurring when the voltage at the base of $Q_{1M}$ goes positive. Therefore, neglecting transistor saturated voltages and base-emitter gaps, the wave forms as illustrated in FIG. 30 occur at various important points of the circuit. Note that the wave form at the collector of $Q_{1M}$ is the inverted wave form at the collection of $Q_{2M}$.

Two highly important and significant operations are carried out in the Video section by what will hereinafter be referred to as the Count Loop and the Memory Chain. Both the Count Loop and the Memory Chain utilize binary and biquinary counters which operate in a manner similar to those discussed above.

The Count Loop's basic function is to count and gate 2000 precision clock pulses each time the DME interrogates the ground station. Various elements of the Count Loop are located on the Operation Circuit Board as well as the three Range Circuit Boards and include the following:

(1) Clock Gate (Monostable Output).
(2) Clock Gating Binary Q804, Q805.
(3) Clock Out (808.78 kg. Sq. Wave).
(4) Gated Schmitt Trigger.
(5) Add Gates.
(6) Count Trigger Line.
(7) Count Binary Q921, Q922, $\frac{1}{10}$ Mile Range CKT Board.
(8) Count Quinary Q929–Q933, $\frac{1}{10}$ Mile Range CKT Board.
(9) Count Binary Q921, Q922, One Mile Range CKT Board.
(10) Count Quinary Q929–Q933, One Mile Range CKT Board.
(11) Count Binary Q921, Q922, Ten Mile Range CKT Board.
(12) Count Quinary Q929, Q933, Ten Mile Range CKT Board.
(13) Count Carry Line.
(14) Pulse Counting Binary Q809, Q810.
(15) Clock Gating Binary Q804, Q805.

Figure 18:
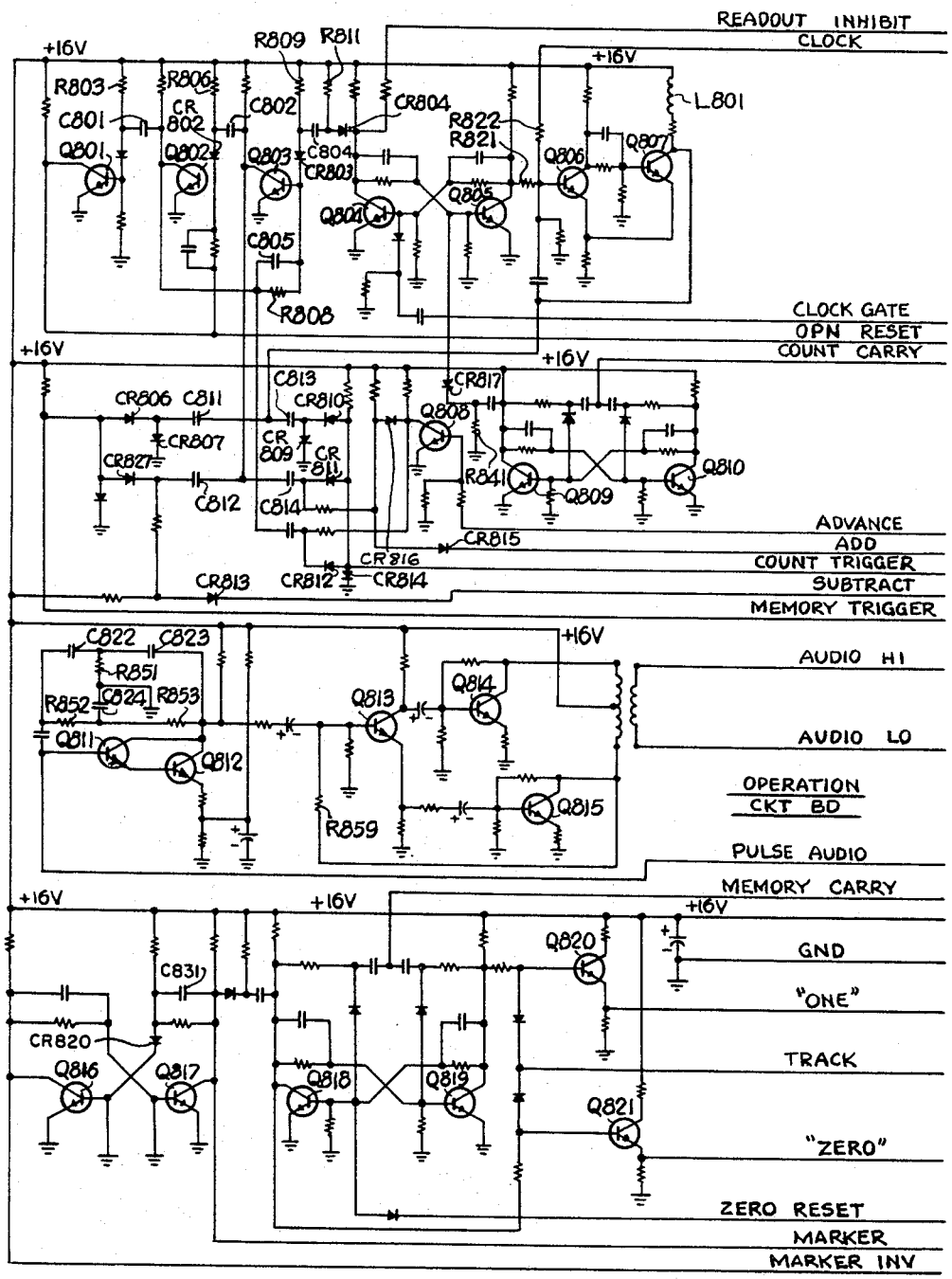
FIG. 18 is a schematic diagram of the Operation Circuit Board also shown in block diagram form in FIG. 7.

Referring to FIGS. 7, 17 and 18, Q804 and Q805 form a set-reset Clock Gate Binary which can be *set* from a negative going Clock Gate input. Once *set* it can be *reset* only by a negative going change of state Q809 whose collector is tied to the base of Q805. Q809 and Q810 form a trigger binary (Pulse Counting Binary) in the hundred mile (1000–2000 count) circuit. Q806 and Q807 comprise a Schmitt trigger, of the character described above, with the addition of L801 in the collector of Q807. This inductor speeds up the switching of large capacitive loads on the Schmitt. Two resistors combine at the base of Q806; resistor R821 from the collector of Q805 and resistor R822 from the clock input (FIG. 18). The Clock Input has an approximately 800 kc. wave form which alternates between +16 volts and ground, is applied to resistors R821 and R822, which form and AND gate with the Schmitt so that when either (or both) Q805's collector and the Clock Gate input is positive, Q806 is held on and the collector voltage of Q807 remains at a high positive value. For Q806 to turn off, *both* Q805 and the Clock Gate input must be at ground potential. When both inputs go to ground a negative going output pulse is obtained as Q806 turns off, Q807 on. This pulse travels through capacitor C813 and diode CR810 to the trigger input of the $\frac{1}{10}$ Mile Count Biquinary on the $\frac{1}{10}$ Range Board. Diode CR809 provides a DC charge path for capacitor C813. Diodes CR811 and CR812 allow other pulses to be gated to the Count Loop without loading or being loaded by the Schmitt trigger.

To initiate the normal operation of the Count Loop, the Clock Gating Binary receives a negative going pulse from the Initiation Board to start the count. This binary allows the gated Schmitt to trigger on the next low voltage point of the square wave clock input. The Schmitt will then follow the clock wave form with a square wave output for as many cycles as permitted by the Clock Gating Binary.

Negative going edges of the Schmitt output are sharp negative spikes, one for each clock cycle. These spikes are counted by the first range board ($\frac{1}{10}$ mile) so that for each ten input pulses, a negative going output carry is obtained. This output is coupled to the second (1 Mile) Range Board which then gives a carry output for each ten of its input pulses or for every 100 Schmitt pulses. The last (10 Mile) Range Board in the chain similarly carries once for every 1000 Schmitt pulses. Note that the $\frac{1}{10}$ Mile Range Board, One Mile Range Board and the Ten Mile Range Board are identical and that the schematic shown in FIG. 17 is a detail schematic indicative of the construction of all three range boards.

The first carry out of the last range board will trigger the Pulse Counting Binary (Q809 and Q810) on the operation board so that Q809 turns off and Q810 turns on. This pulse represents 1000 gated clock cycles. The second carry pulse, representing the second set of 1000 pulses, will turn Q810 back off and turn Q809 on. As the collector of Q809 travels from a positive voltage to ground potential, a negative spike is developed across resistor R841 and is coupled through diode CR817 to the base of Q805. Q805 turns off, the Clock Gating Binary is reset and locks the Schmitt off again. In this manner, the Count Loop has counted 2000 clock pulses and stopped the count at that number. Note that the pulse that reset the Clock Gating Binary was caused by a carry pulse from the Pulse Counting Binary.

Fractions of a microsecond prior to that time, the Pulse Counting Binary was triggered by a carry pulse from the Count Quinary in the Ten Mile Range Board. That Range Board carry was caused by carry from the One Mile Range Board, which in turn was caused by a carry from the $\frac{1}{10}$ Mile Range Board. The carry from the $\frac{1}{10}$ Mile Range Board was, of course, produced by the 2000ths pulse. Thus, the last pulse causes a carry condition to ripple through the first count Biquinary to the Clock Gating Binary and shut off the Schmitt trigger before another clock pulse is gated through. This leaves each counter circuit in the Count Loop in condition of just having carried. The loop is then ready to count a full 2000 pulses for the next cycle.

Turning now to the Memory Chain, it is important to note that the Memory Chain has three basic functions, e.g., (1) to store a number representing distance, (2) to drive the readouts in such a fashion that this number is presented to the operator and (3) convert the stored number into a time interval by means of accurately spaced clock pulses.

The first two functions can be understood by reference to FIGS. 17 and 17a (note that readout coil lines A, B, C, D and F of FIG. 17 connect with their respective coils in FIG. 17a), the schematic diagram of the Ten Mile Range Circuit Board. There are ten possible conditions, or states, formed from the two states of the Memory Binary (Q923, Q924) and the five states of the Memory Quinary (Q916–Q920). Since the Binary precedes the Quinary in the circuit, it changes state every input pulse. The Binary is an indication of whether the number is odd or even, as its original state will be repeated every second input pulse. The Binary drives the conventional emitter followers Q925 and Q926, which in turn, feed the readout "common" drivers Q927 and Q928. The latter two transistors determine the polarity of the readout "common" which will either be held at +6 v. DC through Q927 or at nearly ground potential by Q928.

In the circuitry designed for selection of one of the five readout coils, the collector of each of the transistors of the quinary (Q916–Q920) is connected to the base of a single transistor (Q911–Q915, respectively) in the Quinary Follower circuit. The turning off of any one of the quinary transistors (Q916–Q920) turns on its respective base connected transistor (example—when Q916 turns off Q911 turns on). The emitters of the five Quinary Follower transistors (Q911–Q915) connect to the base of the two transistors, out of 10 total, in the Readout Driver Circuit (Q901–Q910). For example, Q911's emitter connects the bases of Q902 and Q905, Q912's emitter connects the bases of Q904 and Q907, Q913 connects the bases of Q906 and Q909, Q914 connects the bases of Q901 and Q908, and Q915 connects the bases of Q903 and Q910. Thusly the turning on of any one of the Quinary Followers (Q911–Q915) turns on its two base connected Readout Coil Drivers. The outputs from the Coil Drivers (Q901–Q910) are thusly appropriately connected as shown in FIG. 17 to place a ground on one coil and a 6 v. DC on another coil when one of the Quinary Followers Q911–Q915 turns on its respective two of the Coil Drivers (Q901–Q910).

Accordingly, selection of one of the five readout coils (either readout "A," "B," "C," "D," or "F") is made by the Memory Quinary Counter. In FIG. 17, assume Q920 is the off transistor thusly turning Q915 on. With Q915 on, both Q903 and the Q910 coil drivers are turned on. This places a ground on readout coil "D" (see FIGS. 17 and 17a) and +6 v. DC on coil "A." Referring to the chart below, this selects either the number of "1" or the number "0." The polarity of the readout "common" then determines which coil that current will flow through and therefore, which of these two numbers will be presented.

Each range board has an input called "Track." This voltage is positive while the counters are not being triggered. During the time that the counters are active, the track input goes to ground potential. This "kills" the binary and quinary followers to prevent the readouts from being driven and jittered or moving erratically while the counters are switching. The process by which a particular number is presented from a stored condition and the condition of the various transistors involved therein may be determined for each digit by reference to the chart.

frequency source thereby becoming the primary distance standard.

The counter-readout encoding circuitry is arranged so that the number displayed by each readout is a function of the number of additional pulses that must be fed to each counter before it clears. Suppose that a Memory Counter is storing and displaying a "zero." This means that the next trigger pulse into the counter will cause the counter to clear, or carry. Again, a carry output is one where the output wave form goes rapidly from some positive voltage to ground potential. In the case of a "zero" readout, this time delay between the trigger input and the carry output will be very short compared to the time between Clock pulses and will depend only on the switching time of the transistors in the counter (on the order of 10 to 50 nanoseconds). The time delay in this case could be said to be 0 input interval.

If, for example, the number "3" is stored and displayed, the circuit is so arranged that it will take three input triggers before the counter will be ready to carry. At the instant of the fourth trigger input, the counter will carry. This time delay between the first trigger input and the carry input will be a total time between the first and the fourth triggers or three *trigger intervals*. FIG. 20 indicates the trigger inputs as 1, 2, 3 and 4 and the trigger intervals as $T_1$, $T_2$, and $T_3$ with 3T equal to the total time between the first and the fourth triggers. The trigger input wave form may vary slightly from that shown but generally has a rectangular shape, since the trigger may come either from the Schmitt trigger's gated output or from another Memory Counter, depending on a particular counter's position in the Memory Chain. The important or significant factor is the negative-going points

|  | 9 | 8 | 7 | 6 | 5 | 4 | 3 | 2 | 1 | 0 |  |
|---|---|---|---|---|---|---|---|---|---|---|---|
| Q923 |  | Off |  | Off |  | Off |  | Off |  | Off |  } Binary. |
| Q924 | Off |  | Off |  | Off |  | Off |  | Off |  |  |
| Q916 | Off | Off |  |  |  |  |  |  |  |  | } |
| Q917 |  |  | Off | Off |  |  |  |  |  |  |  |
| Q918 |  |  |  |  | Off | Off |  |  |  |  | } Quinary. |
| Q919 |  |  |  |  |  |  | Off | Off |  |  |  |
| Q920 |  |  |  |  |  |  |  |  | Off | Off |  |
| Q926 |  | On |  | On |  | On |  | On |  | On | } Binary |
| Q925 | On |  | On |  | On |  | On |  | On |  | Followers. |
| Q911 | On | On |  |  |  |  |  |  |  |  | } |
| Q912 |  |  | On | On |  |  |  |  |  |  |  |
| Q913 |  |  |  |  | On | On |  |  |  |  | } Quinary Followers. |
| Q914 |  |  |  |  |  |  | On | On |  |  |  |
| Q915 |  |  |  |  |  |  |  |  | On | On |  |
| Q927 | On |  | On |  | On |  | On |  | On |  | } Readout Common Drivers. |
| Q928 |  | On |  | On |  | On |  | On |  | On |  |
| Q901 |  |  |  |  |  |  |  | On | On |  | } |
| Q902 |  | On | On |  |  |  |  |  |  |  |  |
| Q903 |  |  |  |  |  |  |  |  | On | On |  |
| Q904 |  |  |  | On | On |  |  |  |  |  |  |
| Q905 |  | On | On |  |  |  |  |  |  |  | } Readout Coil Drivers. |
| Q906 |  |  |  |  |  | On | On |  |  |  |  |
| Q907 |  |  |  | On | On |  |  |  |  |  |  |
| Q908 |  |  |  |  |  |  |  | On | On |  |  |
| Q909 |  |  |  |  |  | On | On |  |  |  |  |
| Q910 |  |  |  |  |  |  |  |  | On | On |  |
| Common E | +6v | G | +6v | G | +6v | G | +6v | G | +6v | G | } |
| Coil A |  |  |  |  |  |  |  |  |  | +6v |  |
| Coil B |  |  |  |  |  |  |  | +6v |  |  | } Readout Pin Voltages.[1] |
| Coil C | G |  |  |  |  | +6v |  |  |  |  |  |
| Coil D |  |  |  | +6v |  | +6v |  |  | G |  |  |
| Coil F |  | +6v |  |  |  |  | G |  |  |  |  |

[1] Open circuited coils will be at the voltage of the coil common.
NOTE.—Voltages shown are for a stored number of zero.

The actual indicator circuitry may take on various forms such as that disclosed in my copending patent application entitled "Indicator for Distance Measuring Equipment," Ser. No. 575,161, now Patent No. 3,353,443.

As mentioned above, the third function of the Memory Chain is to convert the stored number into a time delay by counting that number of clock pulses. This principle is used to realize one of the basic advantages of the digital approach to distance measuring equipment, i.e., the accuracy of this time delay is essentially that of the source of clock pulses. In the instant invention, the clock pulses are generated by a crystal oscillator, this stable on the trigger wave form and the time interval in between these points.

Referring again to FIG. 17, the condition for a stored "3" would be Q923 and Q919 off in the biquinary counter. This condition presented to the encoding and driving circuitry, would result in a number "3" presentation by the readout.

The first trigger into the counter will reverse the state of the Memory Binary by turning Q924 off and Q923 on. The second trigger will reverse the binary. As Q924 turns on, the negative going collector voltage will trigger the quinary counter so that Q920 turns on and Q919 turns off. The third input trigger will again reverse the binary so that Q924 is off and ready for another carry. The leading edge of the fourth trigger will cause the binary to reverse and carry to the quinary. This immediately causes the quinary to carry as Q920 turns on. Three time intervals will then have elapsed between the time the first trigger was applied and the time the counter carried.

The Memory Counters are connected in a series hook-up similar to the counters in the Count Loop as shown in FIG. 7. The Memory Chain is as follows:

(1) Gated Schmitt trigger (Q806, Q807).
(2) Subtract Gates (CR806–CR808; CR813, CR827).
(3) Memory Trigger Line.
(4) Memory Binary (Q923, Q924), 1/10 Mile Range Board.
(5) Memory Quinary (Q916–Q920), 1/10 Mile Range Board.
(6) Memory Binary (Q923, Q924), One Mile Range Circuit Board.
(7) Memory Quinary (Q916, Q920), One Mile Range Circuit Board.
(8) Memory Binary (Q923, Q924), Ten Mile Range Circuit Board.
(9) Memory Quinary (Q916, Q920), Ten Mile Range Circuit Board.
(10) Memory Carry Line.
(11) Zero-One Binary (Q818, Q819).
(12) Marker Monostable (Q816, Q817).
(13) Output of Marker Monostable both a Marker Pulse and a Marker inverted.
(14) Hundreds Emitter Followers (Q820, Q821) and Output.

For example, suppose the number stored is 121.5. This means that the 1/10 Mile Memory Counter can receive five input pulses before it is *ready to carry* to the One Mile Memory Counter. On the sixth input pulse (five complete clock time intervals) it will carry and at that instant of time the stored marker will have been reduced to 120.9. The addition of nine more clock pulses is required to shift the One Mile Memory Counter down to zero again. The number stored is now 120.0. The next pulse to the 1/10 Mile Counter will cause it to carry to the One Mile Counter, however, the One Mile Counter is storing a zero and must carry on an input. Therefore, it will immediately carry to the Ten Mile Counter reducing its pulse to carry number by one. The stored number is now 119.9. 6+9+1 or 16 pulses have entered the 1/10 Mile Memory Counter to this time and 15 time intervals have elapsed.

The process will continue at a rapid rate (approximately 800 kc.) until the stored condition of the Memory Chain has been reduced to 000.0. At this instant 1215 clock pulses have entered the 1/10 Mile Memory Counter. The hundred mile Zero-One Binary Counter is now ready to carry for the first time. On the 1216th pulse, each counter will carry to the next and this condition will ripple through all four counters. The carry from the Zero-One Binary triggers the Marker Monostable (Q816 and Q817). A total time of 1215 clock intervals has elapsed from the time of the first Clock pulse input to the time the Marker (Marker pulse) appears.

The clock frequency is such that the spacing between clock cycles, or period, corresponds to the time it takes a radio or light wave to travel a round trip one-tenth nautical mile. This makes the time interval between the first input pulse and the Marker, in the above example, the same time delay that might be expected between transmission and reception of a radio wave over a round trip distance of twice 121.5 nautical miles.

For any number stored in the Memory Chain, a direct relationship exists between that number and the time it will take to convert the number into a Marker pulse. Thus, it can be precisely determined whether that number represents a time delay that matches the time delay of the radio wave from the aircraft to the ground station and back.

The Marker pulse is fed to the Gate Board to be compared in time with received Returns. The Gate Board detects errors as the aircraft distance changes and commands an adjustment of the number stored in the Memory Chain so that the equipment can track the changing time delay. A more detailed discussion of the tracking adjustment will appear infra.

In the previous example, the stored number has been converted into a time interval or Marker pulse by adding input triggers until all counters carry. The stored number has been destroyed by the conversion process. The number must be recreated before the next interrogation is made so that the Marker can be generated again. The process by which the counters go back to the condition of 121.5 requires use of the aforementioned Count Loop. Each time the Clock Gating Binary (Q804, Q805) is triggered, it allows the gated Schmitt trigger to pass clock pulses. These gated pulses are directed both to the *Memory Chain* and the *Count Loop*. The pulse path to the Memory Chain is through capacitor C811 and diode CR806 via the Memory Trigger line. The path to the Count Loop is through the capacitor C813 and diode CR810 (see FIG. 18). It should be kept in mind during the discussion that the Count Loop will stop the Gated Schmitt Trigger (Q806, Q807) after it has counted 2000 pulses.

In the example, the Marker pulse appeared at the 1216th inpulse, causing the Memory Chain to be carried from the 000.0 state. The new state of the Memory Chain is 199.9 as all counters move to the next state possible to them. (The next state in sequence from 0 for a decade or biquinary counter is a nine (9), while for the binary counter the only other state is a one (1).) Since the Count Loop is paralleled with the Memory Chain, it has triggered on the same 1216 pulses from the Gated Schmitt trigger as the Memory Chain. The Count Loop will permit 2000 minus 1216 or 784 additional clock pulses from the Schmitt trigger before closing the gate. These 784 pulses will also be directed to the Memory Chain. The addition of these pulses reduces the number of pulses-to-Marker of the Memory Chain by 784. 1999 minus 784 equals 1215. The Memory Chain is now back in its original state of storing the number 1215. Simultaneously, the Count Loop resets the Clock Gating Binary at the 2000th count and the cycle ends.

This cycle is repeated each time the transmitter interrogates. Between cycles, the Memory Chain remains on the stored distance providing drive for the readouts. At the approximate 800 kc. clock rate, it takes about 2.5 milliseconds to count 2000 pulses and complete the cycle. With the unit in "track" mode and interrogating 27 times per second, the time between interrogation cycles is 37 milliseconds. This leaves about 34.5 milliseconds out of every 37 milliseconds for readout drive.

In conventional counting systems, adding a pulse to the counter increases the number displayed. However, as the readout convention of the instant invention is backwards, what is actually being displayed is the number of pulses to carry for each counter, or the number of additional inputs that the counter can hold before it clears and begins again. Thus, the addition of one pulse to the Memory Chain will reduce the number displayed, e.g., the number of pulses-to-carry, and the time it will take to generate a Marker pulse on the next interrogation cycle.

Since the operation of subtraction is accomplished by adding a pulse to the Memory Chain, it would seem that the operation of addition might be done by subtracting a pulse. However, this is not the case because the counters are unidirectional and can move only in one direction. Therefore, to subtract a pulse would require a transfer in a direction opposite from normal. As was pointed out supra, in the discussion on the Memory Chain, if 2000 pulses were added to the chain, all counters will return to their original conditions or state. If one pulse less than 2000 (1999) is added, the registers will cycle to their original state, *less one,* which is an apparent subtraction of one pulse.

Addition may be accomplished by adding pulses to the Count Loop. For example, in order to add 1999 pulses to the Memory Chain, an extra pulse is added to the Count Loop. Then, at the next interrogation cycle, the Count Loop, which already has one pulse, will allow only 1999 pulses to be gated instead of the normal 2000. This will result in a backward shift of the Memory Chain by one position, and an *increase* of one-tenth of a mile in the distance number stored and displayed. Accordingly, a unidirectional counter (the Memory registers) is made bidirectional by selective use of the Count Loop.

*Analogy*

Reference to a simple analogy might help clarify the Memory Chain operation.

Imagine a register or counter with only five states. Note in FIG. 19 that five numbered squares are in line and that a flag will depict the condition of the state of the register. The rules for moving the flag are as follows: (1) adding a pulse shifts the flag from left to right, one position at a time; (2) on reaching the right hand end position, the transfer (carry, in this case) is back to the left end condition.

A point of interest is that the number assigned to the squares of the register does not affect its principles of operation and said numbers being completely arbitrary. Here, the numbering is done from right to left. In FIG. 19, the register is shown storing the number "2." If the shift is done at some regular rate, say on the ticks of a metronome, the third tick of the metronome would carry the flag from the "0" position back to the left end or the number "4" position. By calling this event a Marker Condition, it is noted that the time from the first tick to the third tick was two metronome intervals, and that position was convered directly into time. If two more ticks are applied, the register will move from the "4" position to the "2" position.

Therefore, whatever the position of the register, the addition of five shifts will restore it to its original position. For *any* counter or chain of counters, regardless of its capacity, if the same number of pulses is added as the total number of possible states, it will be restored to its original state. In this analogy, if a subtraction is desired from the number readout (and the time to the Marker) simply add one pulse and shift the flag to the right by one position. One unit can be added to the number readout by adding the capacity of the register less one, or in this case five minus one, or four shifts. This results in a net shift of one position to the left or a larger displayed number.

Turning now to a description of the various important and significant circuit elements and their operation during both search and track, assume the situation where an aircraft, 100 miles from the ground station, is moving toward the ground station and the operator has just manually channelled onto the DME ground station frequency. At this instant of time, the aircraft is 100 nautical miles away from the ground station and the distance displayed will be 000.0 with the unit immediately going into the search mode of operation.

In order to make sure that the display unit will be showing 000.0 and that the beginning of the search is made from 0 mile, the Motor Control section is so designed that upon channelling, a reset pulse is delivered via the Memory Reset line to the Zero Reset Binary (see FIGS. 4 and 21), on the Initiation Board.

The Zero-Reset Binary (Q513, Q514) is emitter triggered and reverses state whenever the unijunction Q515 fires. The normal resting condition is with Q513 off. This condition causes diode CR511 to be reverse biased and diode CR512 forward biased. The Memory Reset line from the Motor Control section will be at positive voltage (plus 28 volts) unless a motor (in the Motor Control section) is running, in which case the line will be grounded. Capacitor C519 will be charged to about 12 volts by the collector voltage of Q513 so that when Q513 turns on and its collector voltage goes toward ground, a negative pulse is applied to the Zero Reset line. This negative pulse resets all memory counters to the 000.0 state so that each counter is ready to carry. When Q513 turns off again, the positive going wave form at its collector is coupled through capacitor C521, diode CR514, and resistor R551 to the base of Q520 (Search Track Binary), switching the Search Track Binary to the "search" mode.

It should be noted that the Zero Reset Binary (Q513, Q514) can be triggered in two ways; by unijunction Q515 due to loss of returns while in the "track" mode, as will be discussed later, or by the channelling operation at any time. During a channelling operation, the Memory Reset Line goes to ground potential, pulling the collector of Q513 to ground through diode CR513. With Q513 at ground potential, Q514 turns off and latches Q513 on. Diode CR511 becomes forward biased, inhibiting the PRF Generator (unijunction Q502) through diode CR502 and resistor R506 in a conventional manner. Thusly, there is no transmitter action until the tuning comes to a halt at the selected channel. When the tuning motors stop at the selected channel, the Memory Reset Line returns to positive voltage (plus 28 volts), causing current to flow through resistor R544. This current flows through diode CR515, charging capacitor C524 to the firing potential of unijunction Q515. Q515 fires, turning Q513 off and Q514 on. As Q513 turns off, the Search Track Binary (Q519, Q520) is triggered into "search" mode. Diode CR511 becomes reverse biased removing the "inhibit" condition from unijunction Q502 and the DME begins to search out from 0 mile at the high PRF. With Q514 on, the current through resistor R544 is shunted to ground through diode CR512 and no current flow exists through diode CR515.

If the Zero Reset Binary (Q513, Q514) is triggered by unijunction Q515, the same sequence as above will follow, however, the Memory Reset line will be at a positive voltage (28 volts) and Q515 will retrigger in about ½ a second due to current through resistor R544 and diode CR515. The ½ second delay allows the readouts, in various types of indicator circuitry, time to roll around to 0 indication before the drive is removed. Thus the Search Track Binary (Q519, Q520) waits this time interval before being driven to the search state.

It is again stressed that due to the construction of the Memory counters, the negative going pulse on the Zero Reset line sets all Memory counters to the 000.0 state. This corresponds to the state of the counter as a whole including all three scale of ten memory counters and the scale of two counter which are necessary for the total count of 2000. In this condition, the Memory Chain will produce a Marker pulse and trigger the Marker Monostable (Operation Board; Q816, Q817) in the event that the Zero-One Binary (Q818, Q819 on the Operation Board) (FIGS. 7 and 18) is set due to a carry condition that rippled through the entire Memory Chain.

As suggested above, the pulse repetition frequency of the DME is derived from a unijunction relaxation oscillator Q502, referred to as the Pulse Frequency Generator. This oscillator can run at either of two rates; approximately 30 cycles per second in the "track" mode and 150 cycles per second during the "search" mode. The explanation and operation of the PRF generator during the "search" mode can best be understood by initially considering the "track" mode.

During the "track" mode current from the +16 volt bus (see FIG. 21) flows through resistor R504 discharging capacitor C503 and charging capacitor C502. The Search Track Binary (Q519, Q520) will be in the "track" state with Q519 turned on. Diode CR510 will not conduct during any part of the cycle and thus is not a consideration in this mode. The same can be said for diode CR511 as it is always reverse biased except during Zero Reset or while the channelling motors are running. No current can flow through resistor R505 or diode CR502 and the discharge rate of capacitor C503 is determined only by resistor R504. The voltage at the unijunction emitter (Q502) will rise to its peak point voltage or trigger level of about 10 volts, depending on the design features and the PRF Adjustment Potentiometer (ADJ) Setting, turning Q502 on. When this happens, capacitor C502 will be rapidly discharged and capacitor C503 rapidly charged until the emitter voltage (of Q502) is reduced to 2 volts or less. Unijunction transistor Q502 will then turn off and the cycle will begin to repeat at approximately 30 c.p.s. While Q502 conducts, a short positive spike appears at resistor R507 and is coupled through capacitor C504 to the base of Q503, the Pulse Amplifier and then to the Inverter Q504 discussed, infra.

With the above in mind, the operation of the PRF generator can now be readily understood during the search mode of operation.

As was noted from the above discussion, Q519 is turned off during the search mode of operation. This forward biases diode CR510 and provides an additional current path to capacitor C503. This path includes resistor R571, the Search line diode CR 510 and resistors R506 and R505 in series. The discharge rate of capacitor C503 is now more than quadrupled, with a corresponding increase in oscillation frequency. Accordingly, the oscillator will "run" at approximately 150 cycles per second during this search mode, which is essentially the interrogation rate of the DME.

The interrogation rate of the DME, both during search and track, will be deliberately "jittered" (made semirandom) by injection of a small noise voltage into the PRF generator. This noise source is a 12 volt Zener diode CR501 Zener diodes will produce "noise" when operated at a low current level in the "knee" or beginning of a Zener region. Q501 serves to hold Zener CR501 in the low current region and to amplify the noise signal. At initial turn-on, Q501 will be cut off and its collector voltage will be nearly at +16 volts. Capacitor C501 will charge through resistor R501 until the cathode voltage of Zener CR501 becomes large enough that the Zener begins to conduct. The small Zener current causes Q501 to turn on and reduce its collector voltage to a point at which the current through resistor R501 is just sufficient to maintain conduction of the Zener and the transistor. The small, random, voltage fluctuations at the collector of Q501 are coupled through capacitor C503 and are superimposed on the rising voltage wave form at the emitter of unijunction Q502. These fluctuations cause the emitter wave form to reach the triggering level of the unijunction earlier or later than it would without the noise voltage, producing a variation in pulse spacing. This variation is typically from 3 to 10 percent of the pulse spacing with two milliseconds of jitter, for example, in a 37 millisecond Track spacing. Since this interrogation is now occurring at a random rate, the only pulse that could possibly appear synchronous with this interrogation would be its own reply.

The 1.617 mc. oscillator Q507, is crystal controlled by crystal Y501 and is the primary time and distance standard of the DME. For example, crystal Y501 may be specified to a tolerance of 0.1% and operated near series resonance in a modified Pierce configuration.

The 1.617 mc. oscillator is coupled directly to a Divider and Wave Form Squarer Binary (Q508, Q509) which divides the sinusoidal input by two producing an 808.786 kc. square wave, low impedance output as discussed with reference to the basic binary, supra. Inductor L501 serves to tune out the extra capacitive load in the collector circuit of Q509. This Clock output is continuous and is applied to both the Synchronizing Gate (diode CR507) and to the Gated Schmitt trigger (Q806, Q807) located on the Operation Board (see FIG. 18). It should be noted that the Gated Schmitt trigger (Q806, Q807) is inhibited by the Clock Gating Binary (Q804, Q805) so that unless permission is given by the Clock Gating Binary the Gated Schmitt Trigger does not trigger or repeat the clock wave form that is applied to its input.

Referring again to the PRF generator, and to the Pulse Amplifier and Inverter (Q503 and Q504), the first Pulse Amplifier Q503 is normally off as there is no DC input to its base. Its collector voltage will rest at about +14 volts except during the short time unijunction Q502 is conducting. When Q502 fires, current through capacitor C504 will momentarily saturate Q503, producing a ground potential condition at its collector for roughly 5 microseconds. This is coupled to the Synchronizing Gate (diode CR507) and to Inverter Q504 through resistor R513. Q504 turns off and "inverts" the ground condition, producing a 5 microsecond positive pulse. This positive pulse is the Pre-Range Reset pulse to the Gate Board which resets the Error Detectors before each interrogation cycle as will be discussed later. Thus, as the PRF Generator triggers, Q503 and Q504 are made conducting and nonconducting, respectively, so that both a positive going and a negative going pulse will be generated. One pulse, the Pre-Range Reset pulse, (the positive going pulse) is applied to the Error Detector on the Gate Board and resets these Detectors to signify that a new interrogation is about to take place. The other pulse out of the Pulse Amplifier and Inverter (the negative going pulse) is applied to the Synchronizing Gate diode CR507. The Synchronizing Gate is a pulse "AND" gate which allows triggering of the Zero Mile Delay Monostable (Q510, Q511) on the first negative going clock cycle following the turning on of Q503. This insures that the transmitter interrogation will always occur in a fixed phase relationship with respect to the Clock cycle to initiate an interrogation cycle. In other words, the PRF generator gives permission for the next occurring Clock cycle to initiate an interrogation cycle. Since this fixed phase is so fine or such a small time increment compared to the gross irregularities between interrogations, the condition is effectively the same as if the interrogations were random but operating on a fixed clock phase.

Following the progressive discussion a Clock pulse has now passed through the Synchronizing Gate to the Zero Mile Delay Monostable. This circuit (Q510 and Q511), operating in typical monostable fashion, triggers the SCR Driver (Q512) on the leading edge of the first Clock pulse allowed through by the Synchronizing Gate.

The SCR Driver remains triggered for 67.8 microseconds and then resets. As it resets (the SCR Driver) the Clock Gate line carries a negative going wave form to trigger the Clock Gating Binary on the Operation Board. The timing of this circuit is adjusted so that the Count Loop and the Memory Chain begin triggering at the exact time that a decoded reply pulse would come out of the IF section if the unit were interrogating a ground station at a distance of 0.0 nautical mile. Thus if the stored distance number in the Memory Chain is 0 mile, the Marker will occur in time coincidence with the reply pulse. This feature will be discussed in more detail infra.

Figure 2:
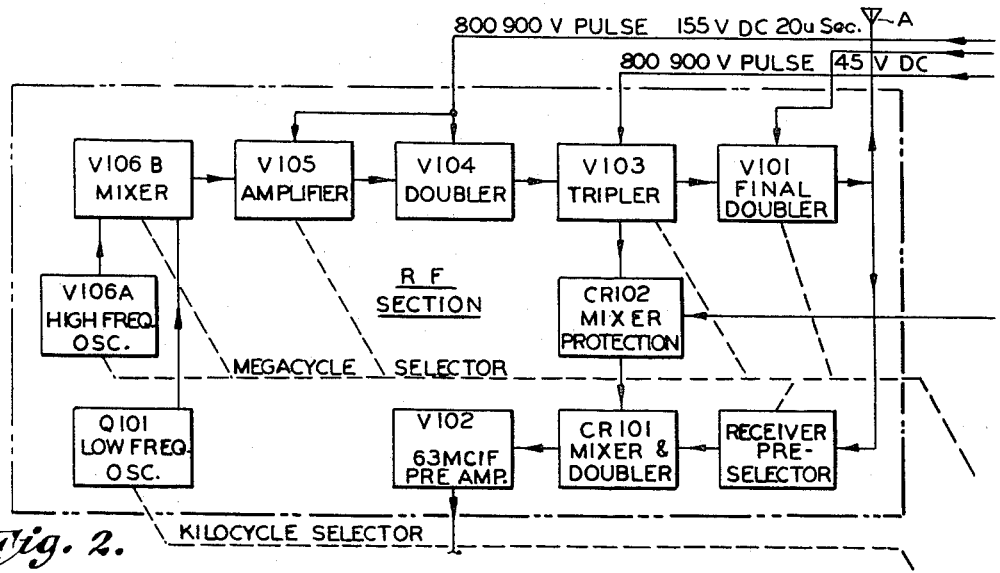
FIG. 2 is a block diagram of the RF section of the DME showing the voltage inputs thereto and the Megacycle and Kilocycle selector shafts.
Figure 3:
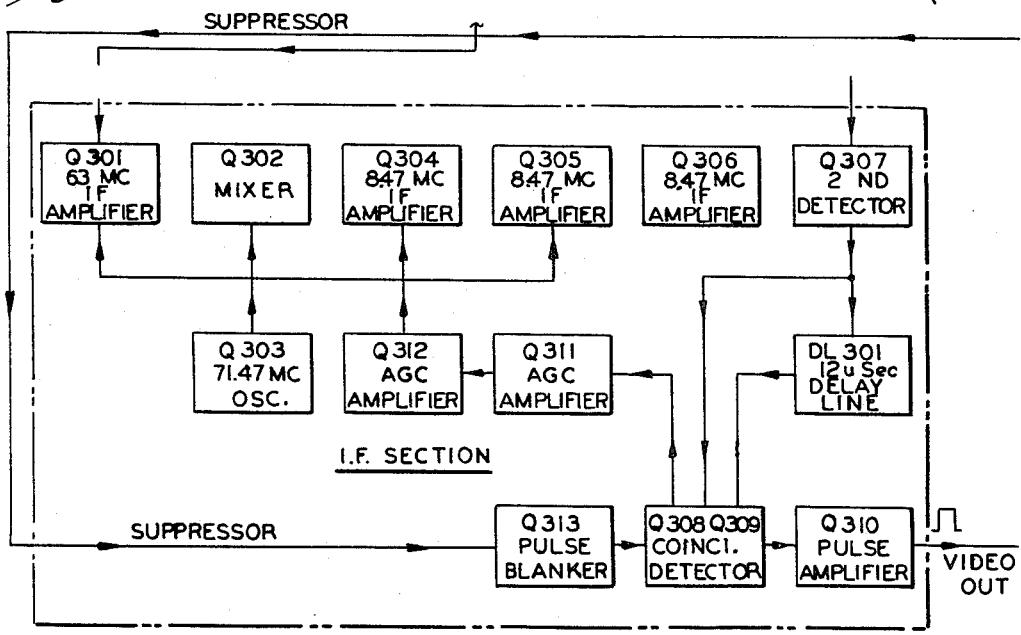
FIG. 3 is a block diagram of the IF section.

The SCR Driver Q512 operates as an emitter follower on the voltage block (wave shape) from Q511's collector (the Zero Mile Delay Monostable). This positive SCR trigger wave form is coupled through resistor R543 and capacitor C517 providing a fast rise trigger to the gate of SCR201 in the Modulator section (FIG. 5). SCR201 will fire and as it is fired it will generate two types of pulses, one slightly delayed from the other. The first pulse will be a broad 800–900 v., approximately 20 microsecond wide pulse. This pulse will set up the power stages in the transmitter and provide a high RF drive level to the final doubler V101 in the RF section (FIG. 2). At the same time, SCR201 fired and created this 20 microsecond pulse in the pulse forming network, it also generates another type pulse in the Pulse Shaping Network. The first of this "other type pulse," 3 microsecond pulse, of the soon to be pulse pair, is a high voltage Gaussian shaped pulse of approximately 1400 to 1800 volts. At the time SCR201 fired, it also caused an LC network to oscillate through at least a quarter of a cycle. This is the Pulse Spacing Network in the pulse modulator section and at the end of this quarter cycle of oscillation, corresponding in time, to 12 microseconds of delay (in other words, the LC circuit has a natural period of 48 microseconds) SCR202 is triggered. The triggering of SCR202 again applies a wave form to the Pulse Shaping Network thusly producing the second pulse of the pulse pair.

The RF pulse (the pulse pair) then travels out the antenna in an omnidirectional fashion and sometime later reaches the ground station 100 nautical miles away. While this pulse is on its way to the ground station, the Zero Mile Delay Monostable (Q510 and Q511) is triggered and remains set for approximately 68 seconds. The purpose of this monostable circuit is to subtract out, from distance considerations, all fixed time delays that are independent of distance. Since the DME is designed to measure a time delay that is a function of distance, it is therefore necessary to subtract out all time delays that are not due to said function. Those delays are fixed system delays and must be accounted for whether they are in the airborne unit or in the ground station.

The ground station has a delay of 50 microseconds and the pulse separation is approximately 12 microseconds (the distance is measured from the second pulse to second pulse) therefore accounting for a delay of 62 microseconds. To be added thereto is an additional 6 microseconds delay which exists due to the fact that the DME commanded the SCR to fire and that there is some delay in the SCR's firing and in the generation of the pulse, thus totaling out to the above-mentioned 68 microseconds. Also, there may be a delay as the wave travels through the various IF amplifiers on reception of the pulse, however, this is empirically determinable and easily accountable so that all the fixed system delays are subtracted out of the design by the Zero Mile Delay Monostable. The only remaining delay will be the one due to the propagation or distance delay and this is the quantity which is to be measured.

With the Zero Mile Delay Monostable (Q510, Q511) subtracting out all the fixed system delays, it then becomes desirable to start the counting of clock cycles at the end of the delay period. As the Zero Mile Delay Monostable resets, the collector of Q511 returns to ground and at this instant the negative going wave form triggers the Clock Gating Binary (Q804, Q805) (on the Operation Board) via the Clock Gate line. The Clock Gating Binary, as a result of being set by the pulse supplied by way of the Clock Gate line, permits the Gated Schmitt Trigger to trigger on the Clock signal as it appears on the Clock Out line, this being the 808.78 kc. signal as mentioned above.

The Gated Clock pulse or plurality of clock pulses emanating from the Gated Schmitt Trigger, is then applied to the Count Loop and the Memory Chain simultaneously through the Add and Subtract gates (see FIG. 7) without modification. As will be later seen, the purpose of the Add and Subtract Gates is to add additional pulses to either the Count Trigger line or the Memory Trigger line and not to modify the Clock signal in any way.

As mentioned above, the Memory Chain and all counters therein, have been sent to the Zero state or the Zero pulses-to-carry condition. Thus, a carry condition will ripple through all counters on the Memory Chain immediately on the application of the first clock pulse and thereby produce a Marker pulse condition at Zero time interval. This, of course, implies that the edge of a clock pulse takes Zero time as the system counts intervals between clock pulses rather than the time it takes for a clock pulse.

The Marker Monostable (Q816, Q817 on the Operation Board) will produce a Marker and a Marker Inverted Pulse. Note that the Marker Inverted Pulse is taken from the opposite transistor (Q816) of the Marker Monostable as the Marker Pulse (Q817) is developed. Also note that diode CR820 is added to the usual monostable circuit (discussed supra) between the timing capacitor C831 and the base of the triggered transistor Q816. The purpose of diode CR820 is to prevent the base emitter breakdown voltage from being exceeded. This monostable is also triggered differently in that the trigger pulse is applied to the collector of the off transistor. By momentarily pulling this point toward ground, the negative change in voltage is applied through capacitor C831 to the base of Q816 turning it off and initiating the quasistable state of this circuit.

It should be pointed out, that the Zero-One Binary (Q818 and Q819) is the last counter in the Memory Chain and that this binary was set to the 0 or ready to carry condition by the Zero Reset line prior to the energization of the Marker Monostable. Likewise, the production of a Marker event is significant as this signifies the end of a time interval that may be proportional to the number stored or displayed in the memory registers or counters.

A brief review of the DME's functions to this point indicates that it has produced an interrogation, waited for a time period corresponding to fixed delays, and has generated a Marker which is proportional to the last remembered distance or the assumed distance, in this case, as the DME is in the search mode. All this time there have been pulses emanating from the IF section. Each pulse represents a decoded pulse pair from the ground station which are replies to other aircraft since, in the assumption, the DME has interrogated only this once and at this instant of time has not yet received a replay. By means of a logic circuit, discussed infra, the DME can create an effective time zone about the Marker. This time zone or time aperture will cause any received video pulse not occurring within 15 microseconds, before and after the Marker, to be eliminated from consideration. Thus only the replies, e.g., video pulses coming out of the Pulse Amplifier Q310 in the IF section, which occur within 15 microseconds either before or after the Marker pulse, will be presented to the logic section for consideration therein.

The assumed conditions further indicate that this was the DME's first interrogation and that the aircraft is 100 nautical miles from the ground station. This essentially means that the time interval between interrogation and reply will be 100 times 12.37 microseconds per round trip nautical mile or approximately 1237 microseconds after interrogation, plus the fixed system time delays both in the DME and in the ground station. Since the DME will consider a time aperture within 15 microseconds before and after the Marker, it will be obvious that a valid reply or video pulse *will not* fall within the limits of the time zone or aperture circumscribing the trial solution (the Marker pulse). It is, however, statistically possible that a reply pulse directed to some other aircraft will fall into this aperture, however the probability of same happening is significantly low. At this point in the discussion, further assume that no video pulse fell within the time zone or aperture, therefore neither the Add Error Detector (Q607, Q608), the Subtract Error Detector (Q611, Q612) or the Zero Error Binary (Q605, Q606) will have been triggered. If a pulse had fallen within the 15 microseconds on either side of the Marker pulse, the Returns Out line on the Gate Board would have been positive as will be seen later. Assuming there was no reply in the time zone, the Returns Out line is not positive (ground potential) and the Returns Ratio Binary, on the Initiation Board (Q516 and Q517) is not set. Also, for the purposes of this discussion, note the reset condition on the Last Return Delay generator (Q524–Q526) and the fact that it too was not set (there being no reply). This reset condition of the Last Return Delay generator causes a positive voltage to exist on the Advance Line going out of the Initiation Board and into the Search Advance Gate (Q808) on the Operation Board.

One interrogation cycle having been completed, with no correlating reply having been detected, e.g., no reply correlated with the assumed distance, the DME's assumed distance is advanced .2 nautical mile and the interrogation cycle is repeated. The Last Return Delay generator (Q524–Q526), as mentioned above, is applying a positive signal on the Advance line to the Search Advance Gate (Q808) on the Operation Board (FIGS. 7 and 18). Also, on the Operation Board is a Three Shot Multi-Vibrator (Q801, Q802 and Q803) which during the interrogation cycle produces three pulses. Since the unit is in the search mode, and the Search Advance Gate is activated, two of the three pulses produced by the Three Shot Multi-Vibrator will be delivered to the Add Gates shown in FIGS. 7 and 18 as diodes CR809–CR812 and CR814–CR816. These pulses are then added to the Count Trigger line only, as will be seen in greater detail by the following description of the Three Shot Multi-Vibrator and the Add and Subtract Gates.

At the end of an interrogation cycle, when the Clock Gating Binary is triggered off by the 2000th pulse into the Count Loop, the collector of Q804 (Clock Gating Binary, FIG. 18) goes sharply to ground. This wave form is coupled through diode CR804 and capacitor C804 to the junction of resistor R809 and diode CR803. The voltage at this point goes below ground, removing base drive from Q803 of the Multi-Vibrator. This condition persists until current through resistor R809 charges capacitor C804 to a positive voltage at the anode of diode CR803. At that time current resumes through diode CR803 into the base of Q803, turning Q803 back on. During the time Q803 is off, its collector voltage rises to the +16 volts supply level. This places a charge on capacitor C802. When Q803 turns back on, a negative going wave form is coupled through this capacitor to diode CR802. The wave form through capacitor C802 removes the base drive from Q802 in a manner identical to what just happened to Q803, and Q802 turns off. The collector of Q802 has a voltage which rises toward the supply voltage. Current is coupled through capacitor C805 and resistor R808 back to the base Q803. This provides regenerative action into Q803 to aid in turn-on and provide a rapid transition in its collector wave form.

Remember that as Q803 started to turn on, this caused Q802 to turn off. While Q802 is off, capacitor C801 is charged by the positive collector voltage. When resistor R806 charges capacitor C802 so that the anode of diode CR802 again becomes positive, current flows through this diode into the base of Q802 and Q803 begins to turn on, reducing its collector voltage. This negative change in voltage is coupled through capacitor C801 and Q801 turns off due to loss of base current from resistor R803. The collector of Q801 goes positive, and this voltage is coupled to the base of Q802, aiding in its continuing to be turned on. Q801 remains off for a time determined by resistor R803 and capacitor C801, at which time current through resistor R803 turns Q801 back on. The circuit will rest in this state with Q801, Q802 and Q803 on as these transistors are held on by current from resistor R803, resistor R806 and resistor R809, respectively. At the start of a new interrogation cycle, when Q804 turns off, capacitor C804 is allowed to charge up through resistor R811. At the end of that cycle when Q804 turns on, sequential pulses will appear at the collectors of Q803, Q802 and Q801, in that order. These pulses are always present at the end of each interrogation cycle, whether they are used or not.

The first two pulses out of the Three-Shot Multi-vibrator are directed to the Add or Subtract gates (see FIG. 7). These are capacitor-diode circuits which will either pass or reject a pulse, depending on a DC input condition.

Figure 22:
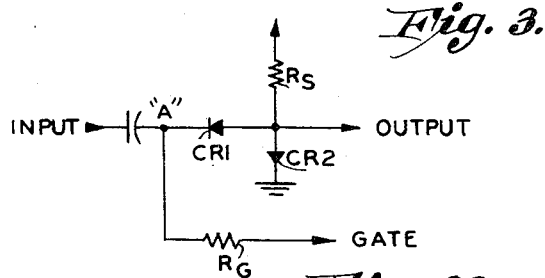
FIG. 22 is a partial circuit diagram showing the "and" gate circuitry used in the DME.

At this point reference is made to FIG. 22 wherein is shown the representative type pulse "AND" gate used in the above mentioned Add and Subtract gates. This "AND" gate requires both a negative going input wave form and a grounded gate condition to have an output. When the gate voltage is higher than the DC voltage at the input terminal, the "A" side of the capacitor will be charged positive. The gate voltage will also back bias diode CR1. If the input terminal is suddenly brought to ground, the resulting negative going wave form coupled through the capacitor to the point "A" will be insufficient to cause conduction through diode CR1. With diode CR1 not conducting, no change will be seen at the output terminal. However, with the gate grounded, *and* a positive DC voltage at the input terminal, the "A" side of the capacitor will be charged negative with respect to the input side. Diode CR1 will be slightly conducting due to current through the $R_g$ and $R_s$ resistors. If the input terminal suddenly becomes less positive, point "A" will now become negative by a voltage equal to the change at the input terminal. This negative spike will forward bias diode CR1, back bias diode CR2, and be present at the output terminal. Diode CR2 serves to return the output terminal to near ground at the end of the negative spike.

As mentioned above, when the DME is in the search mode, two of the three pulses of the Three-Shot Multi-vibrator will be applied to the Add gates at the proper time. As seen in FIG. 18, the Add-Subtract gates are made up of three of the above discussed "AND" gates, two on the Add side (diodes CR811 and CR812) and one on the Subtract side (diode CR827). These gates are paralleled with diodes CR810 and CR806 to provide an "OR" function. This means for example that pulses can be fed to the Memory Trigger Line either from the Gated Schmitt Trigger (Q806, Q807) or from the collector of Q803 in the Three-Shot Multi-vibrator.

On an interrogation cycle, shortly after the transmitter is triggered, the Clock Gating Binary (Q804, Q805) is set, allowing the Schmitt Trigger to switch on the clock pulses as previously discussed. This output travels through the isolation diodes CM806 and CR810 to the Memory Trigger line and the Count Trigger line. At the end of the cycle, the Count Loop resets the Clock Gating Binary and stops the clock pulses. At that instant, Q803 in the Three-Shot Multi-vibrator turns off, charging capacitors C812 and C814. When Q803 turns on again, a negative-going spike may pass through diode CR811 and CR827, depending on whether gate permission is given in the form of a ground condition on the Add or Subtract lines. The Add or Subtract decision is made on the Gate Board during the interrogation cycle, and is made on the basis of a time comparison between the Marker and the video pulses, as will be seen infra. If an Add condition exists, the Add line will be at ground potential and diode CR815 will be conducting, giving gate permission by holding the DC voltage at the junction of capacitor C814 and diode CR811 near ground. The negative spike caused by Q803 will pass through diode CR811 to the Count Trigger line (this will be stored by the Count Loop as if one clock pulse were already counted, and on the *next* interrogation cycle the Count Loop will count only 1999 clock pulses before shutting off).

When in the search mode of operation, the second pulse out of the Three-Shot Multi-vibrator (from Q802) may be used. As mentioned above, this is true only if a positive voltage exists on the Advance line. If such a positive voltage exists, Q808 (Search Advance Gate) will be turned on opening both the diode CR811 and diode CR812 gates. In this case, the pulses from both Q803 and Q802 will be added to the Count Trigger line (a double addition). This increases the Marker time by 0.2 nautical mile each interrogation cycle. (This increasing the Marker time by .2 nautical mile allows the unit to search the full 200 mile range in 6.6 seconds if there is no hesitation by the Marker). At the time Q801 turns off, the pulses from Q802 and Q803 have already been entered in the registers. This pulse from Q801 travels down the Operation Reset line to the Gate Board (FIGS. 6 and 23) and resets the binary circuits (both the Add and Subtract Binarys) on that board to signify that if an Add or Subtract operation (discussed infra) was commanded, it has now been completed.

The two above-mentioned pulses that were added to the Count Loop caused the Count Loop (via the Count Trigger line) on the next interrogation to count only 1998 additional pulses before it has satisfied the requirement of 2000 pulses to command the loop to stop.

A significant factor herein is the nonmodification of the Memory Chain in the time that it produces the Marker on this interrogation cycle. As a result, a shift in the Memory Chain condition will not be produced until after 1998 pulses have been fed through it. Therefore, even though search advance has been given, the command won't take effect until after the Count Loop has cycled once. An incidental result of this is to advance the Marker .2 nautical mile further than necessary to acquire the Return from the ground station on stopping the search (interrogation cycle). This insures that if the aircraft were travelling outbound and the marker stopped at the edge of the reply zone, that reply would not be lost.

It is noted that if a pulse is added to the Memory Chain, the immediate effect is that the Marker will come out sooner than it would have on the previous interrogation cycle. However, a pulse added to the Count Loop will not affect the Memory Chain until the Count Loop has cycled. When the cycling has been completed, the next succeeding interrogation will produce an increase of one count or .1 nautical mile in distance or Marker time. Of course, two pulses will increase the distance .2 nautical mile.

The process of advancing a trial solution or distance number .2 nautical mile or two counts each interrogation will be continued until a time when the Marker is moved so that it correlates with a reply from the ground station due to the aircraft's interrogation or until a random pulse is received that apparently corresponds to the DME's interrogation assumption. Since logically both a valid reply and a randomly received pulse in the Marker region look alike, there is no basis for segregation other than to repeat the interrogation and comparison and then make a judgment on the basis of whether the pulse recurs consistently.

Assume now that the first time that a received pulse falls within the 15 microseconds on either side of a marker, that said pulse is a random occurrence. As mentioned above, the DME has no way of discriminating on the basis of one interrogation, therefore, the search process is stopped at that distance for 4 interrogation cycles. This arbitrary number of interrogations has been selected as four because of satisfactory performance but could be varied because of design characteristics. The DME classifies the random occurrence as a Return in the Gate Board section. This reply will cause a positive signal on the Return line and will set the Returns Ratio Binary (on the Initiation Board, FIGS. 4 and 21) for the first time. The Returns Ratio Binary (Q516, Q517) on being triggered will also trigger that Last Return Delay Generator (Q524, Q526) which will immediately remove the advance condition on the Advance line.

The effect of the removal of the advance condition on the Advance line is to inhibit the Search Advance Gate (Q808, FIGS. 7 and 18) for a time period determined by the Last Return Delay Generator. As mentioned above, it has been found that a four interrogation time period without an additional return is a satisfactory time interval to inhibit the search advance gate.

The first received video pulse (reply) that occurs within 15 microseconds on either side of the marker is termed a "Return" as are all other pulses falling in this time region. Since a positive signal on the Returns line sets the Return Ratio Binary (Q516, Q517, FIGS. 4 and 21) the Returns Ratio Binary is always reset by the Pre-Range pulse and will set in the manner as discussed, supra. If there are no Returns, Q517 will be on and Q516 off, and the collector voltage at Q517 will be essentially zero. As Returns are received, Q517 will be in the off condition only part of the time. If a Return is recognized for every interrogation, Q517 will be off nearly all of the time and the voltage at the collector thereof will be high. Therefore, the DC average voltage at the collector of Q517 over several interrogation cycles is a function of the ratio of the Returns to interrogations. The voltage at the collector of Q516 will be the inverse of that at Q517, e.g., this voltage will be high when the Return ratio is low.

The Last Return Delay generator comprises unijunction Q524 and a binary element Q525 and Q526. As was mentioned above, this circuit operates when four consecutive Returns are missed. Any Return will reset the circuit so that the delay begins again from the last received Return. This circuit controls Interpolation (to be discussed later) during track mode and Search Advance during search mode.

The general operation of the Last Return Delay Generator is as follows: during the search mode, the Marker is advanced by 0.2 nautical mile each interrogation, while seeking a reply zone. If a Return is detected, it is necessary to hold the last distance for several interrogations to determine if this is a random occurrence or a valid Return. If no further Returns are detected for four consecutive interrogations, the Marker advance can resume. However, if another Return is received, for instance, on the third interrogation, the delay will be reset and start again from the last Return, delaying Marker advance at least four additional interrogations. In track mode, the operation is similar in that the circuit allows interpolation after sensing several consecutively missed Returns.

Figure 21:
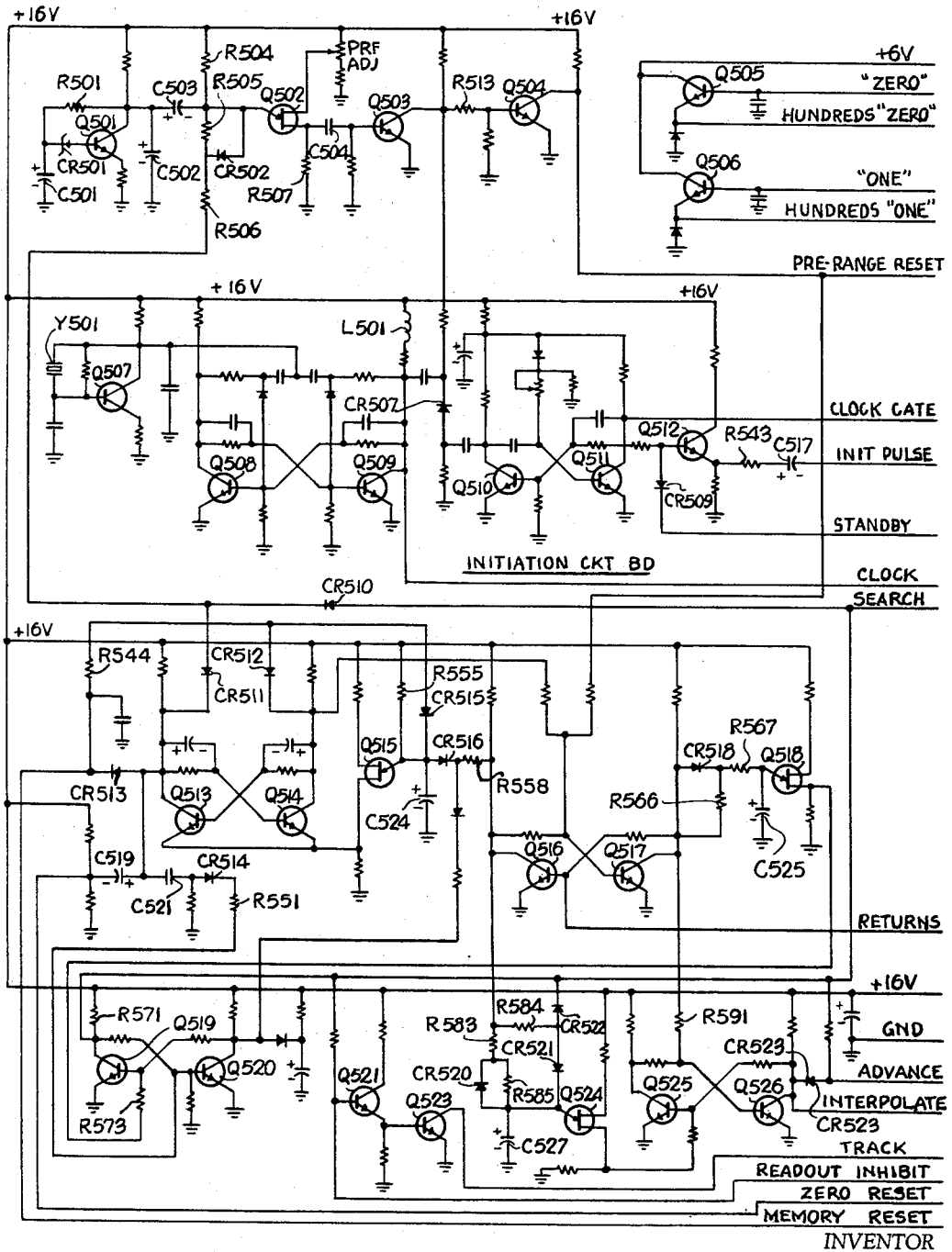
FIG. 21 is a schematic of the Initiation Circuit Board, said Circuit Board also shown in block diagram form in FIG. 4.

The operation of the Last Return Delay Generator can best be explained by reference to FIG. 21 and by considering first, the operation of the circuit in the track mode and finally the operation of the circuit in the search mode.

When in the track mode, the Search Track Binary (Q519, Q520) is in the track state with Q519 on. The Search line will thus be at ground potential, shunting any current through resistor R584 from Q516 to ground. Diode CR521 will be reverse biased and will not affect the operation. When a Return is received, Q516 will be turned on and Q517 turned off for the remainder of that interrogation cycle (Q516 and Q517 comprises the Returns Ratio Binary). This condition will turn on Q526 through resistor R591 (Q526 may already be on, in which case this condition will produce no effect). Capacitor C527 will discharge rapidly through diode CR520 and resistor R583 to the collector of the "ON" transistor Q516. The Pre-Range pulse at the start of the next interrogation will reset the Returns Ratio Binary which will remain reset if no return is received. Capacitor C527 will be slowly charged through resistors R585 and R583 from the high collector voltage of Q516. If no Return is received before capacitor C527 charges to the trigger voltage of the unijunction Q524, the unijunction will fire, turning on Q525. Q526 will release the Interpolate Hold line from the ground potential and allows interpolation to take place at the Gate Board. Interpolation will be more completely discussed, infra, however at this time one only need be aware that it will occur under certain conditions. If a Return is received before Q524 (unijunction) is fired, C527 will rapidly discharge and the delay must start again from the next missed Return.

The operation during the search mode of the last Return Delay Generator is somewhat different in that the Search Track Binary (Q519, Q520) is in the search state with Q519 off. The Search line will thus be at a positive potential, reverse biasing diode CR522 and allowing resistor R584, through diode CR521, to parallel resistor R585 in charging capacitor C527. This compensates for the increased repetition rate in search and lowers the charging time of capacitor C527 so that it again corresponds to about four interrogation cycles. At the end of this time (the charging time of capacitor C527 corresponding to the four interrogation cycles) capacitor C527 charges to the trigger voltage of unijunction Q524 and the unijunction will again fire, turning on Q525. Diode CR523 with a positive potential on its cathode, will not conduct current and it will allow current to be conducted from the positive Search line to the Advance line. Thus Search Advance is allowed unless Q526 is on from a previous Return. In this case, the Advance line is grounded through diode CR523 to the collector of Q526, thus halting search advance.

Consider now the Search-Track decision circuitry, which is essentially comprised of unijunctions Q518 and Q515 which control the mode of the system by monitoring the Return Ratio over a number of interrogation cycles. This is essentially done by the use of integrating level detection circuits which sample each side of the Return Ratio Binary (Q516, Q517).

With the DME in the search mode, the Search Track Binary (Q519 and Q520) will be in the search state with Q519 off. The Marker will be advancing in time and distance as each new trial distance is discarded. With no Returns, Q517 of the Returns Ratio Binary will be on and capacitor C525 will be discharged through resistors R566 and R567. As the Marker advances to within 15 microseconds of the Return, the Error Detectors in the Gate Board will trigger, as will be discussed, infra, and in turn trigger the Returns Ratio Binary. If the Returns ratio is large enough (30% or greater) capacitor C525 will charge through diode CR518 and resistor R567 to the firing potential of unijunction Q518. Q518 on firing, will trigger the Search-Track Binary with a positive pulse through resistor R573. The unit will then be in the track mode and will continue in this mode as long as Returns are sensed. Unijunction Q518 will continue to fire in a saw-tooth fashion but cannot effect further operation.

As mentioned above, the percentage of returns will dictate the voltage on a collector of Q517 of the Return Ratio Binary. If the Returns Ratio Binary was being suscepted to a 50% return (a return for every other interrogation cycle) then the collector of Q517 would have essentially an average voltage of 8 volts or one half of the supply voltage (+16 v.), over a large number of cycles. Since capacitor C525 is more easily charged than discharged, due to the fact that diode CR518 is in shunt with resistor R566, the firing potential of unijunction Q518 can be reached at a lower returns ratio than the 50% mentioned above. This allows a lower design center.

The presence of a high Return ratio implies that the collector voltage of Q516 will have a low DC average value. This will keep capacitor C524 discharged due to the path through diode CR516 and resistor R558 in series with Q516. Should the returns be lost, however, Q516's collector will be at a high DC average voltage and discharge of capacitor C524 will no longer occur. Capacitor C524 will slowly charge due to the current through resistor R555 towards the firing voltage of unijunction Q515. The time from the loss of the Returns to the firing of Q515 varies from about 9 to 15 seconds, depending somewhat on whether the ratio was high or low before it went to zero. If Returns are regained before Q515 is fired, C524 will rapidly discharge through R558. When unijunction Q515 fires, it triggers the Zero Reset Binary, beginning a sequence which places the DME back in the search mode.

A review of the discussion, including the various assumptions, at this time indicates that the DME has been channelled and that the aircraft is still 100 nautical miles away from the ground station. The DME has searched and intermittently advanced and tested distances up to nearly 100 nautical miles and has entered a time zone of distance where a high Returns ratio is present. This is due to the fact that the assumed distance nearly matches the true distance and the Marker is being produced nearly in synchronism with the Return from the ground station. Furthermore, the Returns Ratio Binary (Q516, Q517) caused a high DC average voltage proportional to the Returns ratio and presented this voltage to the Track Decision unijunction, Q518 on the Initiation Board. If the Returns ratio is above the 25% or 30% level (25% of 16 volts) for a significant length of time, the track decision unijunction will fire and trigger the Search Track Binary (Q519, Q520) into track state. The PRF Generator will drop to 30 cycles per second or less due to loss of charging current from the Search Track Binary. If the unit is in track, the Advance line from the Last Return Delay Generator (Q524–Q526) is inhibited and the Last Return Delay Generator takes over a new function, e.g., that of controlling interpolation, which will be discussed later. Further advances of assumed distance will be prohibited unless the DME returns to the search mode. From this point on, the tracking or changing of the distance number must be done by the Gate Board (FIGS. 6 and 23) which is capable of either increasing or decreasing the number stored in the Memory Chain.

Up to this time, the readouts of the DME have not been displaying these assumed numbers and will not do so until the Search Track Binary goes into the track mode. Accordingly, the Track Power Driver on the Initiation Board (Q521 and Q523) supplies the voltage to the range boards on the Track Out line to the readout encoders and permits them to operate.

Referring now to the functional operational of the Gate Board (see FIGS. 6 and 23) its primary function is to compare the received video reply with the Marker pulse and to determine if an error in time exists between the two. If a consistent error is detected, the Gate Board commands the Operation Board (FIGS. 7 and 18) to add to or subtract from the stored distance number until the Marker occurs in time coincidence with the received reply.

The video signal from Q310 in the IF section triggers the Pre-Gate Monostable, Q601 and Q602 via the Video OUT line. The Pre-Gate Monostable is a "pulse stretcher" operating in a conventional manner, which is triggered on the leading edge of each positive video pulse and remains set for a time of 15 microseconds before resetting. Similarly, the leading edge of the positive Marker Inverted pulse triggers the Post-Gate Monostable (Q603 and Q604), which also generates a 15 microsecond block. These two monostables together with the diode gates, CR609 and CR615, form a phase detection circuit which determines the sequence of occurrence between the video reply and the Marker. In other words, the above-mentioned monostables and gates create a logic situation which essentially forms an aperture or time opening about the Marker pulse both 15 microsecnods before and after the Marker pulse.

There are three possible sequences relating to the correlation of the Marker pulse and the video Return (pulse): (1) the Marker pulse following a video Return by 0.5 to 15 microseconds; (2) Marker pulse in coincidence with the video Return, e.g., the Marker leading edge prior to the video Return leading edge by 0.1 to 1.4 microseconds; (3) Marker pulse preceding a video Return by 0.5 to 15 microseconds.

Sequence (1) is considered to be a subtract error, as the Marker appeared after the video Return. This indicates that the distance number stored was too large and should be reduced to shorten the time between interrogation and Marker generation.

Sequence (2) is a Zero Error condition and indicates that the unit is tracking the Return accurately and no correction to the distance number is necessary.

Sequence (3) is an Add Error condition and indicates the time-to-marker was too short. To correct this error, the distance number must be increased.

On the Subtract Error condition, sequence (1), the video Return triggers the Pre-Gate Monostable (Q601, Q602), which enables the diode CR615 pulse "AND" gate for 15 microseconds.. If a Marker Inverted pulse is applied to the gate through capacitor C618 during this time, the negative going trailing edge can pass through diode CR615 and turn off Q612 (of the Subtract Error Detector) causing an output from the Subtract Error Detector. Q611 and Q612 form a binary circuit which is set by a subtract "AND" gate output and reset by the positive Pre-Range Reset pulse through resistor R654 at the beginning of the next interrogation cycle. Diodes CR616 and CR601 provide isolation between the triggering wave forms and the control wave forms.

During the short time (1.4 microseconds) that the Marker voltage is at ground potential, a high speed gate, diode CR605, is enabled through resistor R624 and diode CR606. If the Pre-Gate Monostable (Q601, Q602) is triggered by a Video pulse during this time interval, the negative collector wave form from Q602 is passed by capacitor C606 through diode CR605 and sets Q605 of the Zero Error Binary. The Zero Error Binary (Q605, Q606) is reset by the Pre-Range reset pulse at the start of each interrogation cycle. Also note that the Zero Error Binary will discharge both Add and Subtract Error Integrators. A Zero error detection applies a negative pulse through diode CR605 to turn Q605 off and Q606 on. With Q606 on, both capacitors C613 and C616 will be discharged through diodes CR612 and CR613, respectively.

Figure 24:
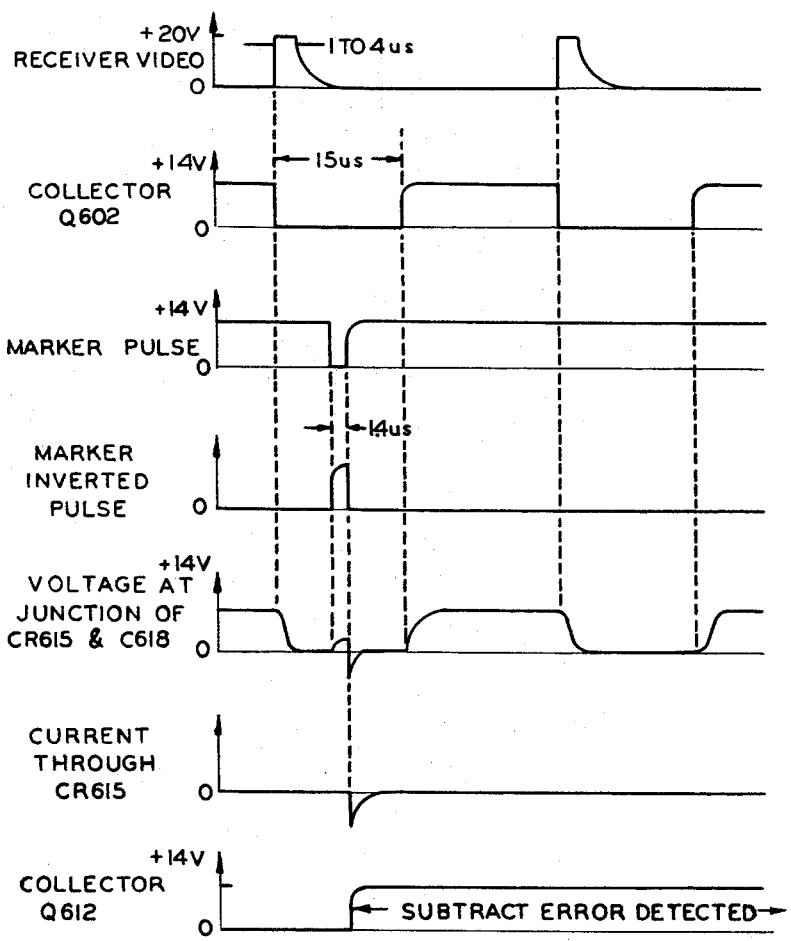
FIG. 24 is a plot of the Waveforms at critical point indicating a Subtract Error Detection.
Figure 6:
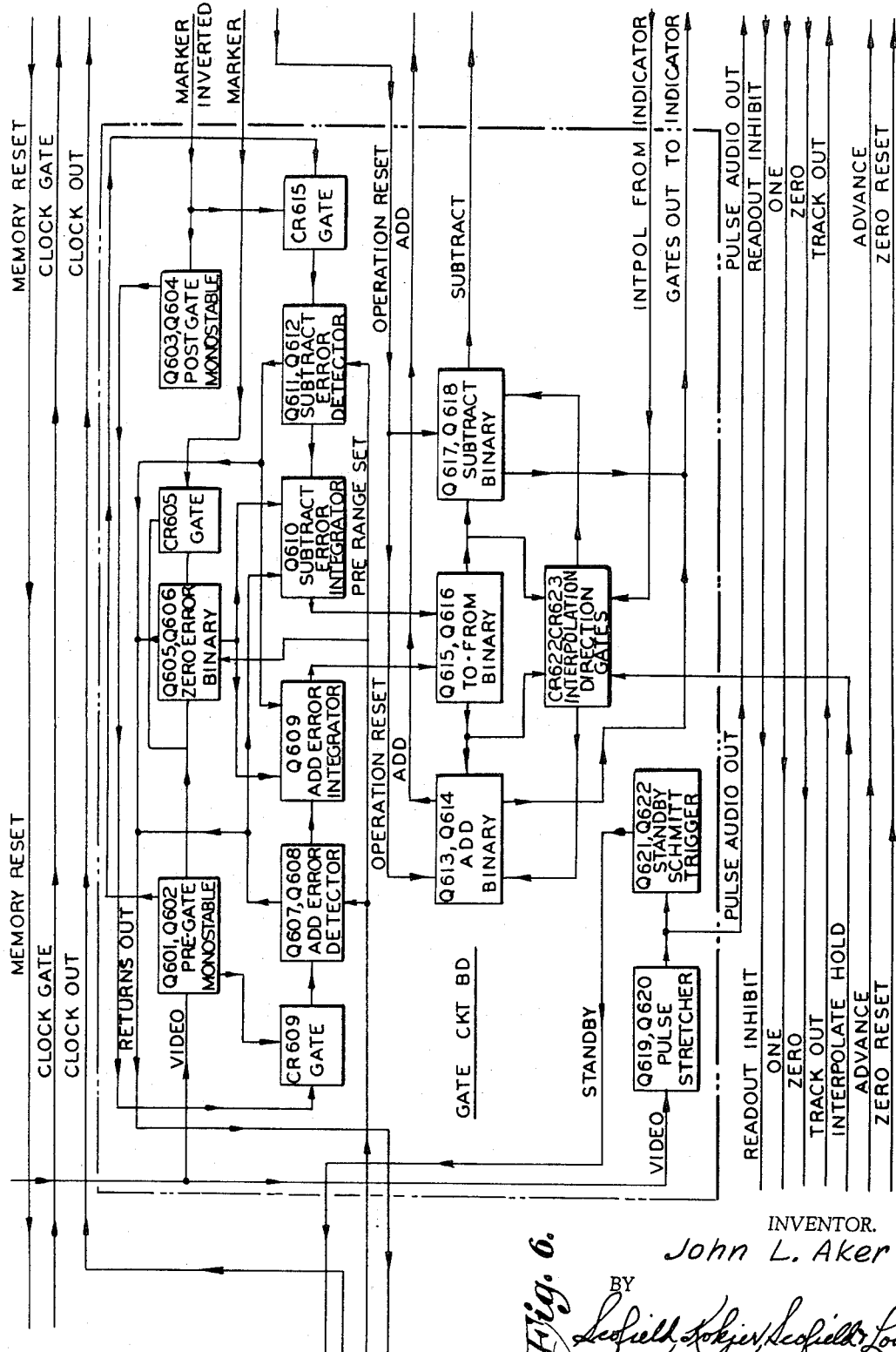
FIG. 6 is a block diagram of the Gate Circuit Board.

To detect an Add Error, the Marker Inverted pulse triggers the Post-Gate Monostable and Q604 remains on for 15 microseconds, opening the diode CR609 gate by way of diode CR607. If a Video pulse triggers the Pre-Gate Monostable during this "open gate" time, the negative-going collector voltage wave form from Q602 passes through capacitor C629 into the base of Q607 causing an output from the Add Error Detector (Q607, Q608). Note FIGS. 24, 25 and 26 displaying Subtract Error, Zero Error and Add Error wave forms, respectively.

These three error conditions create the narrow time zone or "aperture" that encloses the Marker pulse by 15 microseconds in either direction (30 microseconds total width). A Video pulse that differs in time by more than 15 microseconds cannot meet any of these conditions and is ignored by the Gate Board as having too large an error to be a reply to an interrogation. A Video pulse falling within the aperture is identified as a Return as it is close enough in time (distance) to be considered a reply to an interrogation. Or stated another way, a Return is recognized when one of the three Error Detectors has been triggered, i.e., whenever either Q612, Q605, or Q607 is turned off, current will flow through resistor R664, resistors R663 or R665 to the Returns output.

Turning now to the discussion of the Error Detectors, it is pointed out that the Add Error operation as a circuit is symmetrical to the Subtract Error Detector, therefore, allowing a detailed discussion to be limited somewhat to the operation of the Add Error circuit as the Subtract Error circuitry is treated in an identical manner.

Due to the semi-random occurrence of replies from the ground station, an error detected only once is not acted on. Any one aircraft's interrogations may result in from 30 to 90% replies from the ground station, depending on the number of aircraft using that station. Thus, some pulses falling into the return aperture may be ground station replies to other aircraft. These pulses will randomly initiate Add and Subtract Errors. Valid replies (Returns) are separated from random error triggering by accumulating several errors by integration to determine if the error occurs consistently.

All Error Detectors are reset by a positive Pre-Range Reset pulse slightly before the transmitter fires at the beginning of each interrogation cycle. An error will be detected in the first 2.5 milliseconds of the cycle (example: if the unit was tracking at 100 nautical miles, the marker would occur approximately 1.25 milliseconds after the Pre-Range Reset pulse. Error Detection must occur within 15 microseconds of the Marker pulse). Once set, the Error Detectors will not be reset until the Pre-Range Reset pulse occurs to start the next interrogation cycle.

At the track PRF of approximately 30 pulses per second, there is about 37 milliseconds between interrogations, FIG. 27 shows graphically an Add Error condition at several points during several interrogation cycles. For instance, it will be noted that the third interrogation did not receive a reply, thusly indicating a ¾ or 75% return ratio. It is also noted that during an Add Error, the collector of Q607 is at a relatively high DC average voltage, and charges capacitor C613 through resistor R638 and diode CR611. If an Add Error is not present, capacitor C613 is discharged through resistor R637 and the collector of Q607 to ground.

Two other paths may discharge capacitor C613. These are through resistors R641 or R642 when either the Subtract Error Detector (Q611, Q612) or the Zero Error Binary (Q605, Q606) respectively is set. Either of these two conditions casts doubt on an addition operation and requires an accumulation of more Add Errors before the firing of unijunction Q609 is reached. The total effect of these cross connections is that only a few consistent Add Errors are required to produce an addition operation, but as the errors become less consistent the DME tends to wait longer before acting. This prevents jittering of the distance indication while tracking.

Unijunction Q609 has the typical unijunction characteristics of being essentially an open circuit until an emitter voltage of a predetermined value is reached (in this case, 8 to 12 volts). At that voltage the unijunction will "fire" essentially connecting capacitor Q613 to resistor R643 and creating a positive pulse at pin 2, e.g., base electrode (see FIG. 23), due to discharge of capacitor C613. This pulse passes through resistor R674 to the base of Q613 and sets the Add Binary (Q613 and Q614) by turning on Q613 and also goes to the To-From Binary Q615, Q616, as will be seen later. The turning on of Q613 places a ground on the Add line to the Operation Board and results in an addition operation as previously discussed.

Since Q614 is off when Q613 is on, Q614's collector will be positive and current will flow through resistor R694 and diode CR627 to the "Gates" line, triggering the velocity circuit in the indicator. This informs the indicator that a distance change of 0.1 nautical mile is in process. As mentioned above, several different types of indicators could be used herein, therefore the discussion will only broadly disclose the indicator and its functions. On completion of the addition, the Operation Reset pulse from the Three-Shot Multi-vibrator resets the Add Binary (Q613, Q614) by turning on Q614 through resistor R677.

A similar situation exists on the Gate Board when a Subtract Error is detected and integrated. In this situation, both a Zero Error and an Add Error detection would tend to inhibit the Subtract Error integration. The triggering of unijunction Q610 of the Subtract Error Integrator would tend to set the To-From Binary in the To state and cause the Subtract Binary to be set. The paths of setting, in this instance, are through resistors R682 and R688.

The To-From Binary (Q615, Q616) is also connected back to both the Add Error integrator and the Subtract Error integrator in such a fashion as to switch an additional capacitor into the opposite integrator as the last direction was commanded. For example, if an Add Error integration was commanded, this means that the plane is moving outbound and the direction of change is in the From condition or increasing distance. Therefore, the To-From Binary will be in the "from" state with Q616 conducting and Q615 nonconducting. Q615 will have a high positive voltage on its collector and the collector of Q616 will be near ground potential. The high positive voltage on the collector of Q615 will back bias diode CR618 and thusly disconnect capacitor C614 as it has no way to be charged. However, on the Subtract Error integrator, capacitor C615 is esentially paralleled with capacitor C616 through diode CR619 to the collector of Q616 (To-From Binary) to ground thereby more than doubling the time constant required of the Subtract Error integrator before it can fire.

Stated another way, the To-From Binary, Q615 and Q616 serves to "remember" the direction that the aircraft was going on the last addition or subtraction. If the unit is tracking outbound, previous operations all will have been additions, and Q616 will have been turned on by the first pulse from the unijunction Q609 through resistor R681. With Q616 on, capacitor C615 is essentially connected in parallel with capacitor C616 on the Subtract Error integrator. Capacitor C615 can now charge through diode CR619 to the grounded collector of Q616. On the Add half of the circuit, capacitor C614 is disconnected from Q609 as Q615 is off and diode CR618 is reverse biased, preventing capacitor C614 from charging. This has the effect of more than doubling the time constant of the Subtract Error integrator and increasing the number of errors that must be detected before a reversal of direction is permitted. If the aircraft reversed its direction relative to the ground station, Q610 would eventually fire. Q615 would then turn on, switching the binary into the "to" state and connecting capacitor C614 to the Add Error integrator Q609 and disconnecting capacitor C615 from the Subtract Error integrator Q610. Thereafter, subtraction will continue in a manner similar to the addition as discussed above.

The effect of this circuit arrangement is to make the DME hesitate or integrate longer on a reversal of direction. This is because if the DME had been detecting an Add Error and suddenly a Subtract Error appears, this implies that the plane has reversed its direction with respect to the ground station, and therefore, it becomes necessary to prevent the normal statistical occurrences from having a reversal effect on the operation of the DME.

The To-From Binary (Q615, Q616) also serves to provide interpolation direction during a loss of signal condition.

Under normal conditions, the pulse rate to the Gates line informs the indicator of the relative velocity of the aircraft with respect to the ground station. At 600 k.t.s. (nautical miles per hour), the tenth mile rate of change will be 100 per minute. One type indicator usable with the DME converts this pulse rate into a velocity voltage and also converts this velocity voltage back into a pulse rate. The interpolate pulse is continuously fed back to the Gate board but is not normally used. These pulses are synchronized to the Gate line pulses so that they occur at approximately the same time and rate as the error commanded additions or subtractions. Should returns momentarily be lost due to ground station identity or because of some blockage in the line of sight radio path, the interpolation pulses are allowed to substitute for the pulses of the Error Integrators. This allows the unit to continue tracking in the same direction and at the same rate as it was before the signal was lost, maintaining the continuity and distance display.

The interpolate pulses from the indicator are applied to resistors R667 and R668. The Interpolate hold line is normally at ground potential by command of the Initiation Board (Last Return Delay Generator). The Last Return Delay Generator is here operating in a similar fashion to when in search except now the delay is in allowing interpolation, rather than Search Advance. The current through resistors R667 and R668 due to the positive Interpolate pulses is shunted by diodes CR622 and CR623 to ground. If Interpolation is called for, the Interpolate Hold line will rise to a positive voltage of about 14 volts, back biasing diodes CR622 and CR623. With these diodes now back biased, the Interpolate pulse is still shunted to ground by either diodes CR625 or CR626, depending on the state of the To-From Binary. If the last operation from the Error Integrator was a subtraction, then the To-From Binary will be in the "To" condition as Q615 would have been turned on by a pulse from Q610. Diode CR625 will shunt the pulse current from resistor R667 to ground through the "on" transistor Q615. Q616, however, will be cut off and its collector will be at a high positive voltage, back biasing diode CR626. The pulse current from resistor R668 will be allowed to pass through diode CR624 and resistor R689 into the base of Q618, setting the Subtract Binary (Q617, Q618). A subtraction operation will thus be carried out by the interpolation pulse in the same manner as if it had been commanded by the Q610 Subtract Error Integrator.

An important refinement to the DME circuitry is the Standby Circuitry located on the Gate Board (see FIG. 23). It operates by sensing the average decoded squitter rate received from the ground station (typically from 700 to 2700 p.p.s.). If the average rate drops below about 300 p.p.s., it indicates that the reception path is submarginal and the transmitter is shut off. The Standby circuit prevents useless transmitter operation when the ground station is not being received (as when the wing of a plane may dip to block reception), when out of range, or when tuned to an ineffective channel. This also insures (on initial turn on) that the high voltage pulses are not applied to the transmitter tubes until their cathodes have warmed sufficiently to take the pulse currents without damage.

At initial turn on, no Mixer injection will be developed in the RF section until the tubes in the multiplier chain have warmed up. When these tubes reach their operating temperature, the received signals will produce video inputs to the Gate Board as described above, additionally deactivating the Standby circuit and allowing modulator high voltage pulses to be initiated.

In operation, each decoded video pulse from the IF section (Q310) triggers the Pulse Stretch Monostable (Q619, Q620) by turning on Q620 through resistor R698. Q619 turns off, holding Q620 on through resistor R701 and remains off until capacitor C621 can change back through resistor R696, turning Q619 back on and Q620 off. For each received video pulse, a positive voltage block about 150 microseconds wide occurs in the collector of Q619. Capacitor C622 is charged by current through a resistor R704 and diode CR630 during the voltage block and discharged by resistor R703 in the absence of pulses. In this way the average voltage on capacitor C622 is proportional to the average rate of video pulses.

In the absence of received pulses, capacitor C622 will be completely discharged to ground potential and Q621 in the adjacently connected Standby Schmitt Trigger (Q621, Q622) will be off. Q622 will correspondingly be on, holding the Standby line clamped to near ground potential. If the received squitter rate is greater than 300 p.p.s., capacitor C622 will charge to about 2 volts and Q621 will snap on, turning Q622 off which removes the ground condition on the Standby line.

The Standby line connects to the Initiation Board (see FIGS. 4 and 21) where Q512 (SCR Driver) is inhibited by diode CR509 while the Standby Schmitt Trigger is grounding the Standby line, preventing SCR Trigger pulses from reaching the Pulse Modulator. While in the track mode, the Standby function is disabled by an input to the Gate Board through R708 connected to the Track line. Q621 is forced to remain on, allowing continuous transmitter action while the unit remains in track.

Another accessory, however nevertheless an important subsystem aiding in the optimum function of the DME is the Identity circuitry.

Audio signals are transmitted by each DME ground station on all VOR/DME channels to help the pilot verify what he is receiving. For example, Mid-Continent International Airport serving the Kansas City, Mo. area, may transmit in International Morse Code, the letters M–C–I every 45 seconds. By use of the unique Identity circuitry described infra, a pleasant audio tone may be received by the pilot during DME operation. This signal is transmitted at 1350 c.p.s. and requires a filtering network to aid in the reception of same.

The Identity circuit begins with the Video Pulse Stretcher (Q619, Q620) on the Gate Board. The Pulse Stretcher as mentioned above, is simply a monostable which is triggered on for about 150 microseconds by each Video Pulse from the IF section. The collector of Q619 goes positive during this length of time and applies a voltage block to the filter network of R705, R706, R707 and capacitor C623. This network changes the ratio of the DC component to the AC component of the voltage block. The output of this network is applied directly to the base of Q811 on the Operation Board (see FIGS. 7 and 18). It should be noted that this network is the only source of DC bias for this particular stage.

Q811 and Q812 form a Darlington circuit with a voltage gain of about 40, with the output reversed in phase with respect to the input. The negative feedback network from collector to base of Q811 includes resistors R851, R852, R853; capacitors C822, C823 and C824 which form a "Twin T" network, which has a notch in its transfer characteristics at 1350 cycles per second (c.p.s.). This means at 1350 c.p.s. the amplifier has its full gain of 40. At other frequencies a large part of the output is fed back to the amplifier input through the "Twin T" network in such fashion as to cancel the input voltage, thus reducing the net gain of the amplifier to near unity.

In addition to the active band-pass characteristics of the network-amplifier combination, a band-pass effect is obtained by the use of the net DC component out of the Pulse Stretcher (Q619, Q620). If the Pulse Stretcher is being triggered at a low rate, then its output voltage will *average* only slightly above ground. At a high trigger rate, such as 2700 PRF the output voltage will average around 10 volts. The DC component, at 1350 PRF, will bias Q811 and Q812 to their optimum operating point. At lower or higher PRF's these transistors will be biased toward cutoff or saturation, respectively.

The sine-wave 1350 c.p.s. from the amplifier is applied to the base of Q813. Q813 is an audio Phase Inverter which supplies two signals 180° apart to the bases of the push-pull output transistors Q814 and Q815. Q814 and Q815 operate in Class B to provide 50 to 100 milliwatts of sine-wave identity tone. Resistor R859 acts as a DC bias for Q813 and supplies negative feedback for the audio circuit.

From the foregoing, it will be seen that this invention is one well adapted to attain all of the ends and objects hereinabove set forth together with other advantages which are obvious and which are inherent to the process and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a DME of the type adapted to transmit an interrogation pulse and to receive replies from a ground station transponder, said replies being both in response to said transmitted interrogation pulses and in response to other interrogation pulses in other DME units operating in the same VOR/DME frequency channel, the improvement comprising:

means for producing a Marker pulse, said Marker pulse representing an assumed time duration wherein a valid reply known as a Return would frequently occur for every interrogation pulse if said DME were at a distance from said ground station transponder that correlated to the time duration that said interrogation pulse would take to travel to said ground station and back to said DME, a running clock supply having a plurality of clock pulses emanating therefrom upon the transmission of said interrogation pulse and deliverable to said Marker pulse producing means, said Marker pulse producing means including a memory chain, said memory chain operable to store a number of pulses representing a time delay or distance, said memory chain producing said Marker pulse each time said chain has counted a number of pulses equal to the count capacity of said chain, and a count loop, said count loop operable to count and gate a predetermined number of pulses each time an interrogation pulse is transmitted and to cut off the number of clock pulses delivered to said memory chain, and means for changing the time for production of said Marker pulse until said Marker pulse occurs in near time coincidence with said return, said time for production of said Marker pulse thereby being an indication of the distance of said DME from said ground station transponder.

2. The invention as in claim 1 wherein said running clock supply is comprised of a crystal controlled oscillator.

3. The invention as in claim 1 wherein said Memory Chain has a counter having a plurality of states or stages, said Chain being arranged and said counter states identified so that the number assigned to a particular counter state is a function of the number of pulses that must be fed to said Chain before said counter in said Chain can clear and produce said Marker pulse.

4. The invention as in claim 3 wherein said counter is comprised of a plurality of stages, each stage having a transistor therein, each of said transistors having a base electrode, a collector electrode and an emitter electrode, said counter being so arranged that during operation one transistor is off and the other remaining transistors are on, said counter comprising:

means for connecting the base of each on transistor to the collector line of the off transistor, means for capacitively coupling the collector line of the off transistor to the base of the next succeeding on transistor, means for maintaining said succeeding transistor on but unsaturated while the other remaining on transistors are both on and saturated, and means for directing input pulses to the off transistor thereby turning said off transistor on and said succeeding unsaturated on transistor off.

5. The invention as in claim 3 wherein said Memory Chain has said counter states arranged for undirectional sequential shifting so that the counting of each input thereto shifts the present state of said counters by an amount equal to said input, and said now present counter state having a lesser number assigned thereto, indicating that a lesser number of pulses need be added to said Memory Chain in order to clear all said counters therein and produce said Marker pulse.

6. The invention as in claim 5 wherein said counters in said Memory Chain are arranged to return to their original states when a number of pulses equal to the total capacity of the counters therein is added to said Chain.

7. The invention as in claim 6 wherein said Count Loop has a plurality of counter states, said loop being arranged and said counter states identified so that the number assigned to a particular counter state is a function of the number of pulses that must be fed to said Loop before said counters in said Loop can carry and cut off the number of pulses presented both to itself and said Memory Chain.

8. The invention as in claim 7 wherein the number of pulses needed to produce a Marker pulse in said Memory Chain may be increased by adding pulses to said Count Loop from a source other than the pulses produced by said running clock supply, said Count Loop thereby limiting the number of clock pulses presented to said Memory Chain to a number equal to the capacity of Memory Chain less said amount added to said Count Loop from said separate source.

9. The invention as in claim 1 wherein said DME includes an Identity Circuit for the reception of audio signals from said ground station, said Identity Circuit comprising:
  a monostable circuit, said monostable circuit operable to be triggered on by each Return, thusly producing a voltage block, an amplifier circuit
  circuit means for coupling said voltage block to said amplifier circuit, and
  means associated with said amplifier circuit for causing said amplifier to have full gain at a preselected frequency so no gain at frequencies other than said preselected frequency thereby effectively rejecting all frequencies except said preselected frequency, said preselected frequency corresponding to the said audio signal frequency from said ground station.

10. The invention as in claim 9 wherein said amplifier associated means is a Twin T notch filter network located in the negative feedback network of said amplifier circuit.

11. In a DME of the type adapted to transmit an interrogation pulse and to receive replies from a ground station transponder, said replies being both in response to said transmitted interrogation pulses and in response to other interrogation pulses in other DME units operating in the same VOR/DME frequency channel, the improvement comprising:
  means for producing a Marker pulse, said Marker pulse representing an assumed time duration wherein a valid reply known as a Return would frequently occur for every interrogation pulse if said DME were at a distance from said ground station transponder that correlated to the time duration that said interrogation pulse would take to travel to said ground station and back to said DME, and
  means for changing the time for production of said Marker pulse until the ratio of replies to interrogation pulses over a plurality of interrogation is at least a predetermined minimum, said ratio being substantially independent of the interrogation rate, said time for production of said Marker pulse thereby being an indication of the distance of said DME from said ground station transponder.

12. The invention as in claim 11 wherein said DME has a search mode of operation and a track mode of operation, said operational modes being controlled by an integrating level detection circuit, said level detection circuit including a means for determining the ratio of returns substantially independent of the interrogation rate to interrogations, and means for switching modes of operation depending on the minimum value of said ratio.

13. The invention as in claim 12 wherein said DME interrogates at a higher PRF rate when in the search mode of operation than when in the track mode of operation, and including a means for automatically changing the PRF of a PRF generator upon the switching of the modes of operation, said last named means being operably dependent upon said minimum ratio.

14. The invention as in claim 13 wherein said DME includes a means for deliberately randomizing the interrogation rate of said PRF generator by injecting a noise voltage into said PRF generator, said noise voltage being derived by operating a Zener diode at a low current level in its Zener region.

15. The invention as in claim 13 wherein said means for changing the time for production of said Marker pulse includes a circuit means for detecting the sequence of occurrence of said Marker pulse relative to said Returns within a predetermined time aperture, and wherein said sequence detecting means includes a first means for detecting if said Marker pulse follows the Returns within said time aperture, indicating a subtract error condition, a second means for detecting if said Marker pulse is in coincidence with the Returns indicating a zero error condition, and a third means for detecting if said Marker pulse precedes said Return within said time aperture indicating an add error condition.

16. The invention as in claim 15 wherein said first and third means produce an output pulse for each respective subtract and add error condition and a subtract error integrating means for determining the consistency of occurrence of said subtract error conditions, an add error integrating means for determining the consistency of occurrence of said add error condition, said means for changing the time for production of said Marker pulse operable upon the output of said subtract error integrating means or said add error integrating means to change the time for production of said Marker pulse until said Marker pulse occurs in time coincidence with said Return.

17. The invention as in claim 16 wherein said second means includes an operative circuit connection to reset said subtract error integrating means and said add error integrating means causing said integrating means to delay operation of said means for changing the time for production of said Marker pulse for a preselected number of interrogation cycles wherein no zero error condition is indicated.

18. The invention as in claim 16 including a means for remembering the direction that the DME was going on the last add error change or a subtraction error change, said remembered DME direction being either to or from said ground station.

19. The invention as in claim 18 wherein said DME includes circuit means for interpolating change in time (distance) for production of said Marker pulse in the direction of the last known distance change, either to or from said ground station transponder, even though the Returns from said transponder may be momentarily lost.

20. The invention as in claim 11 wherein said DME includes a running clock supply having a plurality of clock pulses emanating therefrom upon the transmission of said interrogation pulse and deliverable to said Marker pulse producing means, said Marker pulse producing means including a means for counting and storing a number of said clock derived pulses which is related to the distance from said DME to said ground station, said Marker pulse being produced each time said counting and storing means counts a preselected number of said clock derived pulses.

21. The invention as in claim 20 wherein said preselected number is equal to the count capacity of said counting and storing means.

22. The invention as in claim 20 wherein said DME includes a means for counting a predetermined number of said clock derived pulses and for limiting the number of said clock derived pulses deliverable to said counting and storing means when said last mentioned counting means has counted its capacity.

23. In a DME of the type adapted to transmit an interrogation pulse and to receive replies from a ground station transponder, said replies being both in response to said transmitted interrogation pulses and in response to other interrogation pulses in other DME units operating in the same VOR/DME frequency channel, the improvement comprising:

means for producing a Marker pulse, said Marker pulse representing an assumed time duration wherein a valid reply known as a Return would frequently occur for every interrogation pulse if the DME were at a distance from said ground station transponder that correlated to the time duration that said interrogation pulse would take to travel to said ground station and back to said DME, means for changing the time for production of said Marker pulse until said Marker pulse occurs in near time coincidence with said Return, said time for production of said Marker pulse thereby being an indication of the distance of said DME from said ground station transponder, and means for digitally determining said time for production of said Marker pulse, said last named means consisting of two digitally operated counting registers.

24. In a DME of the type adapted to transmit an interrogation pulse and to receive replies from a ground station transponder, said replies being both in response to said transmitted interrogation pulses and in response to other interrogation pulses in other DME units operating in the same VOR/DME frequency channel, the improvement comprising:

means for producing a Marker pulse, said Marker pulse representing an assumed time duration wherein a valid reply known as a Return would frequently occur for every interrogation pulse if the DME were at a distance from said ground station transponder that correlated to the time duration that said interrogation pulse would take to travel to said ground station and back to said DME, means for changing the time for production of said Marker pulse until said Marker pulse occurs in near time coincidence with said Return, said time for production of said Marker pulse thereby being an indication of the distance of said DME from said ground station transponder, a first and second digital counting register, each register being capable of counting and storing numerical information, and a common source of clock pulses driving each register, said registers cooperatively operable to digitally determine said time for production of said marker pulse without transfer of numerical information, thereby being substantially independent of each other.

25. The invention as in claim 24 wherein said registers are unidirectional and wherein one of said registers stores a number which is a function of said assumed time duration, said number being changeable until said Marker pulse occurs in said near time coincidence with said Return.

26. The method of digitally identifying and tracking valid returns to interrogation pulses from a plurality of replies including randomly occurring replies, said method comprising the steps of:

assuming a time period wherein returns to interrogation pulses may possibly occur, changing said assumed time period until the ratio of said replies to said interrogation pulses is at least a predetermined minimum substantially independent of the interrogation rate, thereby indicating that said replies are valid returns to interrogation pulses and that said time period has been correctly correlated.

27. The invention as in claim 26 including the step of digitally counting the time intervals between clock pulse cycles to determine the duration of said assumed time period.

28. The invention as in claim 26 including the step of maintaining said assumed time period once said minimum ratio is reached at least until said ratio falls below said minimum value.

29. The invention as in claim 28 including the steps of representing said time period by a Marker pulse and detecting the time coincidence of said Marker relative to a Return within a prescribed time aperture.

30. The invention as in claim 29 including the step of integrating deviations in time coincidence between said Marker pulse and said Return within said prescribed time aperture.

31. The invention as in claim 30 including the step of changing said assumed time period in a direction depending on the integration of said deviations.

References Cited

UNITED STATES PATENTS

| | | | |
|---|---|---|---|
| 3,075,189 | 1/1963 | Lisicky | 343—7.3 |
| 3,239,835 | 3/1966 | Crow | 343—7.3 |
| 3,243,811 | 3/1966 | Hose | 343—7.3 X |
| 3,246,324 | 4/1966 | Price | 343—7.3 |
| 3,321,757 | 5/1967 | Crow et al. | 343—7.3 |
| 3,354,455 | 11/1967 | Briggs et al. | 343—7.3 |

RICHARD A. FARLEY, *Primary Examiner.*

T. H. TUBBESING, *Assistant Examiner.*